US012647168B2

(12) United States Patent
Patchava et al.

(10) Patent No.: US 12,647,168 B2
(45) Date of Patent: Jun. 2, 2026

(54) PHASE SWEEPING PROCEDURE FOR AMBIENT INTERNET OF THINGS DEVICES

(71) Applicant: QUALCOMM Incorporated, San Diego, CA (US)

(72) Inventors: Raviteja Patchava, San Diego, CA (US); Piyush Gupta, Bridgewater, NJ (US); Junyi Li, Fairless Hills, PA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 18/585,600

(22) Filed: Feb. 23, 2024

(65) Prior Publication Data

US 2025/0274184 A1     Aug. 28, 2025

(51) Int. Cl.
 *H04B 7/06*        (2006.01)
 *H04B 7/022*       (2017.01)
(52) U.S. Cl.
 CPC ........... *H04B 7/0682* (2013.01); *H04B 7/022* (2013.01)
(58) Field of Classification Search
 CPC .............................. H04B 7/0682; H04B 7/022
 See application file for complete search history.

(56) References Cited

U.S. PATENT DOCUMENTS

| | | | | |
|---|---|---|---|---|
| 2014/0119362 A1* | 5/2014 | Tong | .................. | H04L 27/3472 |
| | | | | 370/350 |
| 2022/0141677 A1* | 5/2022 | Bai | ...................... | H04L 5/0085 |
| | | | | 370/329 |
| 2023/0141393 A1* | 5/2023 | Elshafie | ................ | H04W 76/15 |
| | | | | 307/104 |
| 2024/0023020 A1* | 1/2024 | Wang | ...................... | H02J 50/20 |

FOREIGN PATENT DOCUMENTS

WO     WO-2025046366 A1 *   3/2025   ......... G06K 19/0723

OTHER PUBLICATIONS

International Search Report and Written Opinion—PCT/US2025/015690—ISA/EPO—May 21, 2025.

* cited by examiner

*Primary Examiner* — Freshteh N Aghdam
(74) *Attorney, Agent, or Firm* — QUALCOMM Incorporated

(57)         ABSTRACT

Various aspects of the present disclosure generally relate to wireless communication. In some aspects, a phase sweeping procedure involves a first network node transmitting a first signal at a first phase while one or more second network nodes transmit a plurality of second signals at a plurality of second phases. In some aspects, the phase sweeping procedure may produce a plurality of combined signals, each combined signal a combination of the first signal and at least one of the plurality of second signals. For example, the first signal and the one or more second signals may constructively interfere with each other to produce a signal of sufficient energy to be received by an ambient internet of things (IoT) device. The ambient IoT device may transmit, to a network node, an indication of a received signal power associated with the combined signal.

20 Claims, 14 Drawing Sheets

700

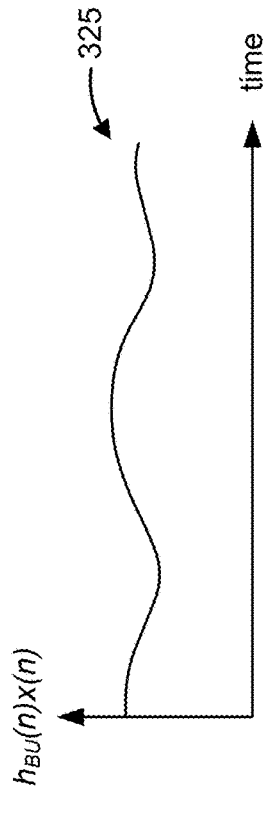
$h_{BU}(n)x(n)$
325
time
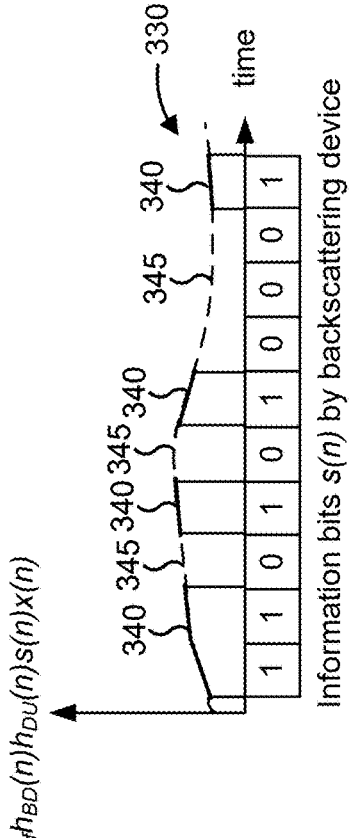
Information bits $s(n)$ by backscattering device
$\sigma_f h_{BD}(n)h_{DU}(n)s(n)x(n)$
330
time
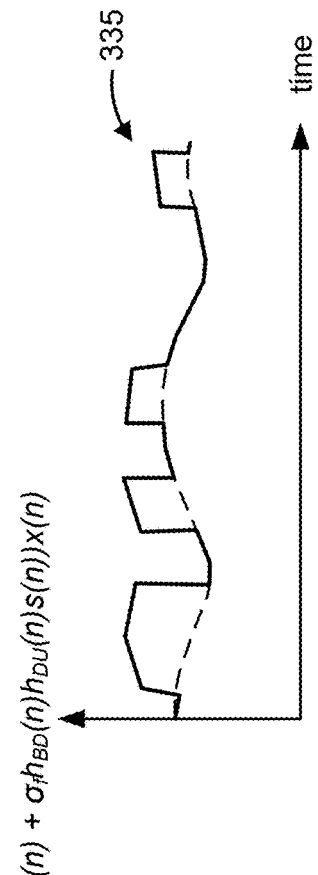
$(h_{BU}(n) + \sigma_f h_{BD}(n)h_{DU}(n)s(n))x(n)$
335
time
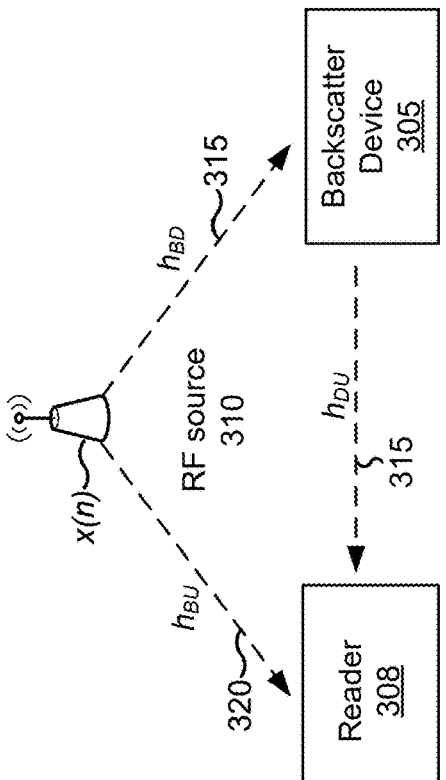
FIGURE 3

500

TRP B
505

TRP A
505

Backhaul
Coordination

PDCCH
(e.g., Mode 2)

PDSCH
(same or
different)

PDCCH
(e.g., Mode 1
or Mode 2)

120

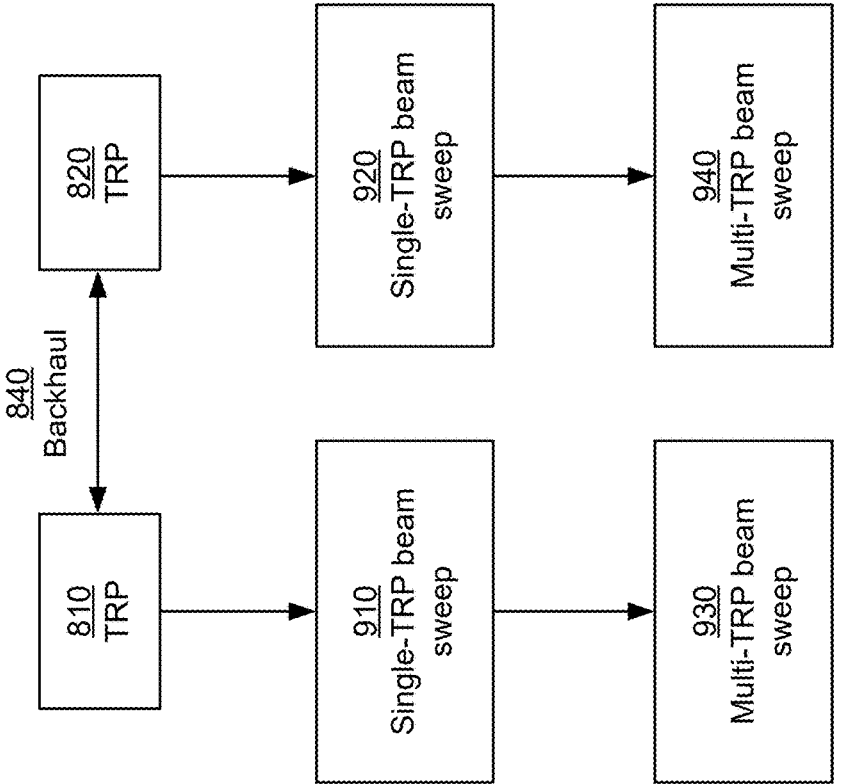
FIGURE 9

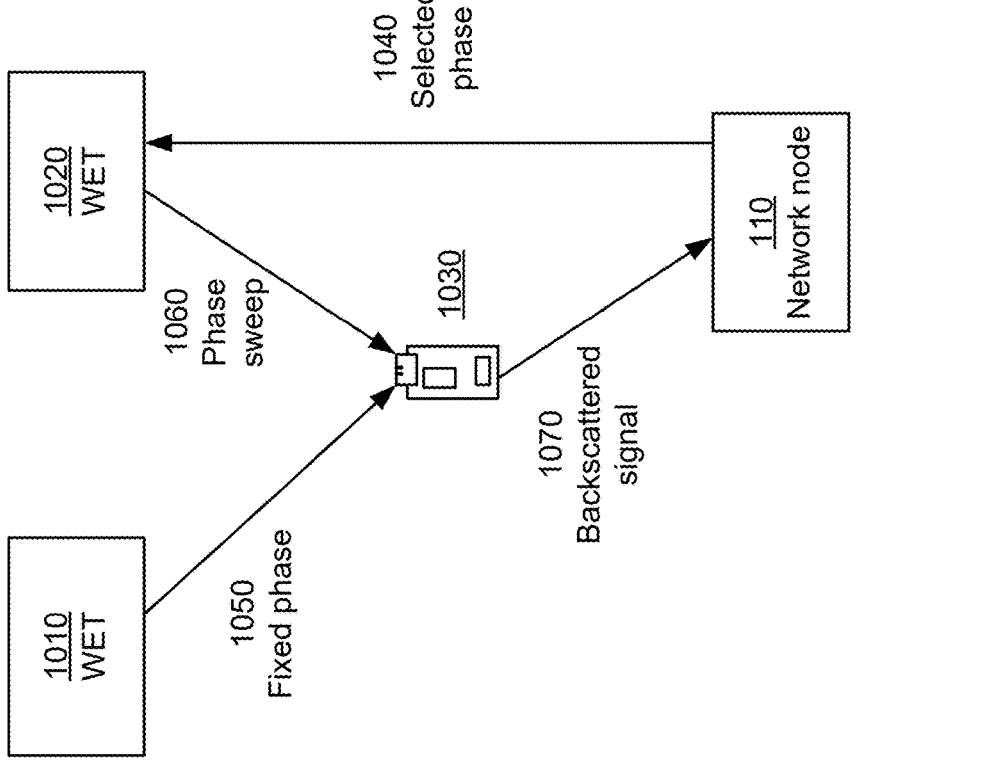
1000
FIGURE 10

Receive, in accordance with a phase sweeping procedure, a signal that is a combination of a first signal transmitted by a first network node at a first phase and one or more second signals transmitted by one or more second network nodes at one or more second phases Transmit an indication of the one or more second phases in accordance with a received signal power

1110

1120

1100

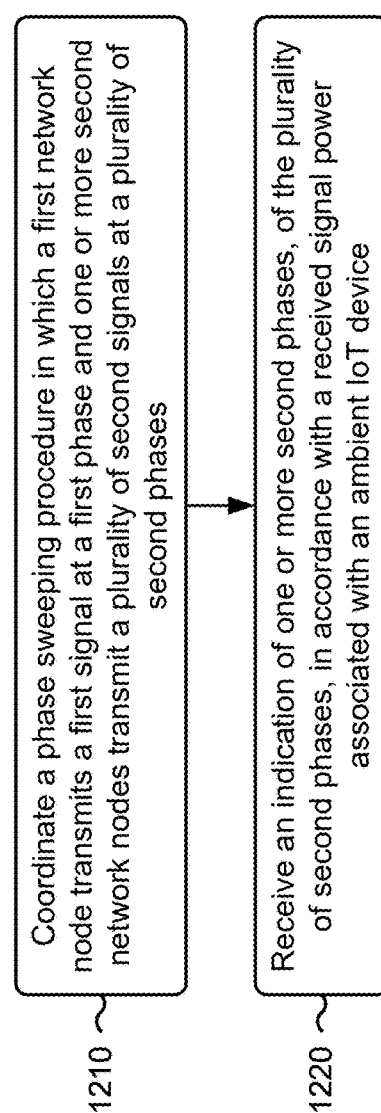

1210 — Coordinate a phase sweeping procedure in which a first network node transmits a first signal at a first phase and one or more second network nodes transmit a plurality of second signals at a plurality of second phases 1220 — Receive an indication of one or more second phases, of the plurality of second phases, in accordance with a received signal power associated with an ambient IoT device

PHASE SWEEPING PROCEDURE FOR AMBIENT INTERNET OF THINGS DEVICES

FIELD OF THE DISCLOSURE

Aspects of the present disclosure generally relate to wireless communication and specifically relate to techniques, apparatuses, and methods associated with a phase sweeping procedure for ambient internet of things devices.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

Coherently combining signals transmitted from network nodes may involve estimating channel phase information from each of the network nodes to an ambient IoT device. Without the channel phase information, the signals from the network nodes may be combined at random phases, rather than phases that allow for coherent combining (for example, constructive interference). Further complicating the channel estimation, without the coherently combined signal, the ambient IoT device may be unable to backscatter or actively transmit channel estimation information.

SUMMARY

Some aspects described herein relate to an apparatus for wireless communication at an ambient internet of things (IoT) device. The apparatus may include one or more memories storing processor-executable code and one or more processors coupled with the one or more memories. At least one processor of the one or more processors may be configured to cause the ambient IoT device to receive, in accordance with a phase sweeping procedure, a signal that is a combination of a first signal transmitted by a first network node at a first phase and one or more second signals transmitted by one or more second network nodes at one or more second phases. At least one processor of the one or more processors may be configured to cause the ambient IoT device to transmit an indication of the one or more second phases in accordance with a received signal power.

Some aspects described herein relate to an apparatus for wireless communication at a network node. The apparatus may include one or more memories storing processor-executable code and one or more processors coupled with the one or more memories. At least one processor of the one or more processors may be configured to cause the network node to coordinate a phase sweeping procedure in which a first network node transmits a first signal at a first phase and one or more second network nodes transmit a plurality of second signals at a plurality of second phases. At least one processor of the one or more processors may be configured to cause the network node to receive an indication of one or more second phases, of the plurality of second phases, in accordance with a received signal power associated with an ambient IoT device.

Some aspects described herein relate to a method of wireless communication performed at an ambient IoT device. The method may include receiving, in accordance with a phase sweeping procedure, a signal that is a combination of a first signal transmitted by a first network node at a first phase and one or more second signals transmitted by one or more second network nodes at one or more second phases. The method may include transmitting an indication of the one or more second phases in accordance with a received signal power.

Some aspects described herein relate to a method of wireless communication performed at a network node. The method may include coordinating a phase sweeping procedure in which a first network node transmits a first signal at a first phase and one or more second network nodes transmit a plurality of second signals at a plurality of second phases. The method may include receiving an indication of one or more second phases, of the plurality of second phases, in accordance with a received signal power associated with an ambient IoT device.

Some aspects described herein relate to a non-transitory computer-readable medium storing a set of instructions for wireless communication. The set of instructions may include one or more instruction that, when executed at an ambient IoT device, may cause the ambient IoT device to receive, in accordance with a phase sweeping procedure, a signal that is a combination of a first signal transmitted by a first network node at a first phase and one or more second signals transmitted by one or more second network nodes at one or more second phases. The set of instructions may include one or more instruction that, when executed at the ambient IoT device, may cause the ambient IoT device to transmit an indication of the one or more second phases in accordance with a received signal power.

Some aspects described herein relate to a non-transitory computer-readable medium storing a set of instructions for wireless communication. The set of instructions may include one or more instruction that, when executed at a network node, may cause the network node to coordinate a phase sweeping procedure in which a first network node transmits a first signal at a first phase and one or more second network nodes transmit a plurality of second signals at a plurality of second phases. The set of instructions may include one or more instruction that, when executed at the network node, may cause the network node to receive an indication of one or more second phases, of the plurality of second phases, in accordance with a received signal power associated with an ambient IoT device.

Some aspects described herein relate to an apparatus for wireless communication. The apparatus may include means for receiving, in accordance with a phase sweeping procedure, a signal that is a combination of a first signal transmitted by a first network node at a first phase and one or more second signals transmitted by one or more second network nodes at one or more second phases. The apparatus may include means for transmitting an indication of the one or more second phases in accordance with a received signal power.

Some aspects described herein relate to an apparatus for wireless communication. The apparatus may include means for coordinating a phase sweeping procedure in which a first network node transmits a first signal at a first phase and one or more second network nodes transmit a plurality of second signals at a plurality of second phases. The apparatus may include means for receiving an indication of one or more second phases, of the plurality of second phases, in accordance with a received signal power associated with an ambient IoT device.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 3 is a diagram illustrating an example associated with backscatter communications, in accordance with the present disclosure.

FIG. 9 is a diagram illustrating an example associated with a beam sweeping procedure, in accordance with the present disclosure.

FIG. 10 is a diagram illustrating an example associated with wireless energy transmitters (WETs), in accordance with the present disclosure.

FIG. 12 is a flowchart illustrating an example process performed, for example, at a network node or an apparatus of a network node that supports a phase sweeping procedure for ambient IoT devices, in accordance with the present disclosure.

DETAILED DESCRIPTION

Figure 1:
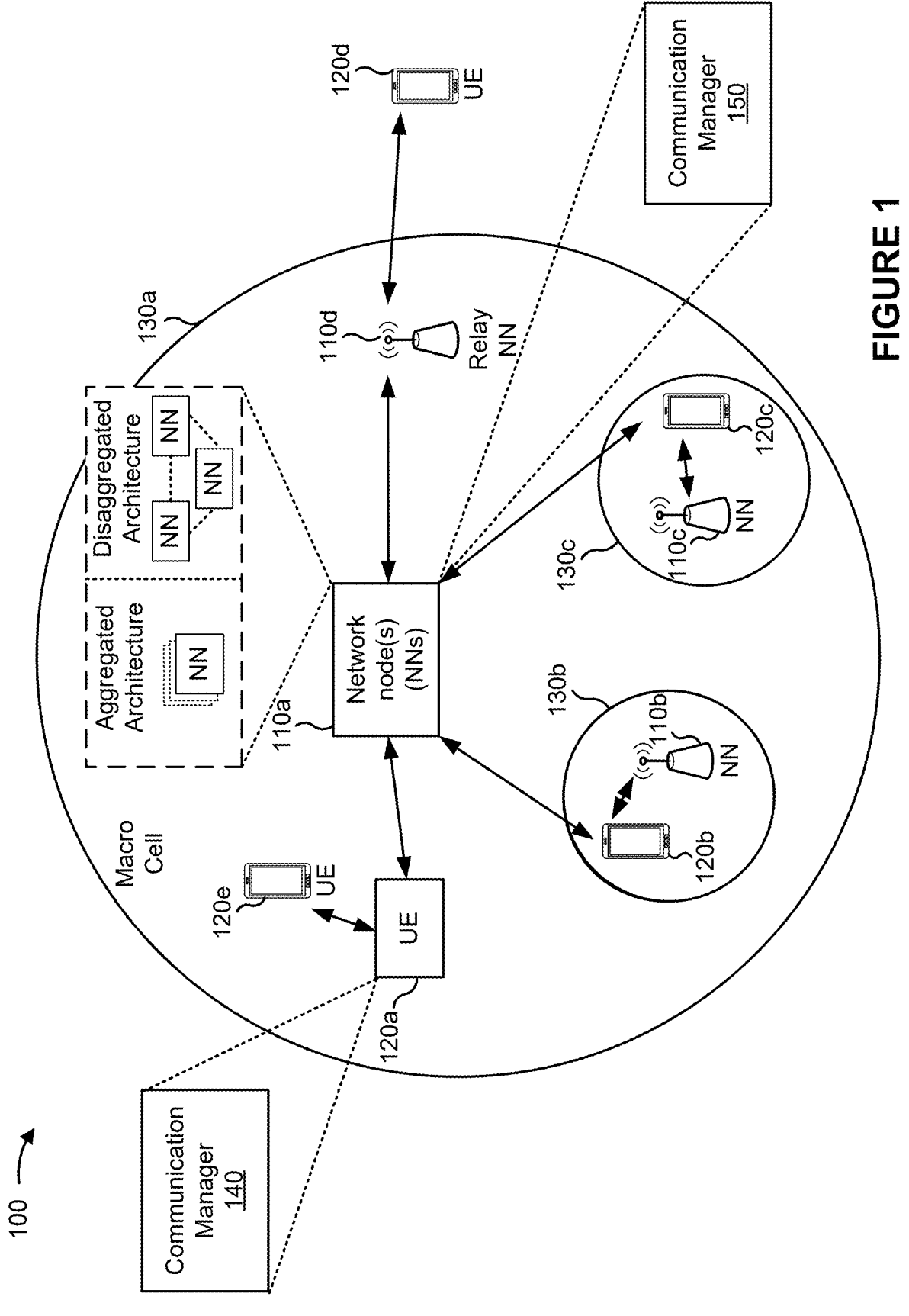
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Some wireless communication devices may be considered internet of things (IoT) devices, such as ambient IoT devices (sometimes referred to as passive IoT devices or ultra-light IoT devices), or similar IoT devices. In ambient IoT, a terminal (for example, a radio frequency identification (RFID) device, a tag, or a similar device) may not include a battery, and the terminal may accumulate energy from radio signaling. To achieve further cost reduction and zero-power communication, wireless networks may utilize a type of ambient IoT device referred to as an "ambient backscatter device" or a "backscatter device." However, some cell-edge ambient IoT devices may be unable to harvest sufficient energy from a single network node to enable communication between the cell-edge ambient IoT devices and the network.

Signals from neighboring network nodes may be coherently combined such that an ambient IoT device, such as a cell-edge ambient IoT device, may receive a stronger signal, thereby improving coverage for power transfer. However, coherently combining the signals transmitted from the network nodes may involve estimating channel phase information from each of the network nodes to the ambient IoT device. Without the channel phase information, the signals from the network nodes may be combined at random phases, rather than phases that allow for constructive interference.

Further complicating the channel estimation, the ambient IoT device may be unable to backscatter or actively transmit channel estimation information without the coherently combined signal. For example, in the case where the ambient IoT device is an energy-harvesting tag (for example, a passive tag), the ambient IoT device may be unable to harvest the energy necessary to transmit the signal without the coherently combined signal. As a result, coverage for the ambient IoT device may be unavailable.

Various aspects relate generally to a phase sweeping procedure for ambient IoT devices. Some aspects more specifically relate to a phase sweeping procedure that involves the first network node transmitting a first signal at a first phase while one or more second network nodes transmit a plurality of second signals at a plurality of second phases. In some aspects, the phase sweeping procedure may produce a plurality of combined signals, where each combined signal is a combination of the first signal and at least one of the plurality of second signals. For example, the first signal and the one or more second signals may constructively interfere with each other to produce a signal of sufficient energy to be received by the ambient IoT device. In some examples, one or more of the combined signals may be non-coherent combinations of the first signal and at least one second signal that carry insufficient energy to be received by the ambient IoT device. The ambient IoT device may transmit, to a network node, an indication of the combined signal with a highest received signal power of all the combined signals produced as a result of the phase sweeping procedure.

In some aspects, the phase sweeping procedure may involve multiple stages. In a first stage, a first network node may transmit a first signal at a first phase and one or more second network nodes may transmit a plurality of second signals at a plurality of second phases. In a second phase, the one or more second network nodes may transmit a plurality of third signals at a plurality of third phases while the first network node transmits a signal (for example, the first signal). The first stage of the phase sweeping procedure may involve lower-resolution phase sweeps, and the second stage of the phase sweeping procedure may involve higher-resolution phase sweeps.

In some aspects, a network node may transmit, in accordance with a beam sweeping procedure that occurs before the phase sweeping procedure, timing information associated with the phase sweeping procedure. For example, the timing information may indicate when the beam-phase sweeping procedure is scheduled to occur. The ambient IoT devices that can receive the timing information may refrain from responding to any signals detected during the phase sweeping procedure. The ambient IoT devices that cannot receive the timing information (for example, because the timing information is transmitted by a single network node) may respond to any signals detected during the phase sweeping procedure.

Particular aspects of the subject matter described in this disclosure can be implemented to realize one or more of the following potential advantages. In some examples, by using the phase sweeping procedure, the described techniques can be used to assist ambient IoT devices in receiving coherently combined signals. For example, the phase sweeping procedure may enable a network node to estimate channel phase information for the ambient IoT devices. For example, the network node may identify at least one combination of phases from the phase sweeping procedure that are coherently combined at an ambient IoT device. As a result, coverage of the ambient IoT devices, such as cell-edge ambient IoT devices, may be improved.

The first and second stages of the phase sweeping procedure may decrease total sweep time or improve power transfer efficiency, among other examples. For example, the multi-stage phase sweeping procedure may avoid extended high-resolution sweeping, which would increase total sweep time or reduce power transfer efficiency, among other examples.

The timing information associated with the phase sweeping procedure may reduce a quantity of ambient IoT devices that respond to the phase sweeping procedure. As a result, ambient IoT devices that can be supported by non-coherent-combined signals may not interfere with ambient IoT devices that cannot be supported by non-coherent-combined signals. For example, the timing information may enable one or more network nodes to detect an identification of cell-edge ambient IoT devices.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, IoT connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) user equipment (UE) functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long-Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication.

In some aspects, the UE 120 may include a communication manager 140. As described in more detail elsewhere herein, the communication manager 140 may receive, in accordance with a phase sweeping procedure, a signal that is a combination of a first signal transmitted by a first network node at a first phase and one or more second signals transmitted by one or more second network nodes at one or more second phases; and transmit an indication of the one or more second phases in accordance with a received signal power. Additionally or alternatively, the communication manager 140 may perform one or more other operations described herein.

In some aspects, the network node 110 may include a communication manager 150. As described in more detail elsewhere herein, the communication manager 150 may coordinate a phase sweeping procedure in which a first network node transmits a first signal at a first phase and one or more second network nodes transmit a plurality of second signals at a plurality of second phases; and receive an indication of one or more second phases, of the plurality of second phases, in accordance with a received signal power associated with an ambient IoT device (for example, the UE 120). Additionally or alternatively, the communication manager 150 may perform one or more other operations described herein.

Figure 2:
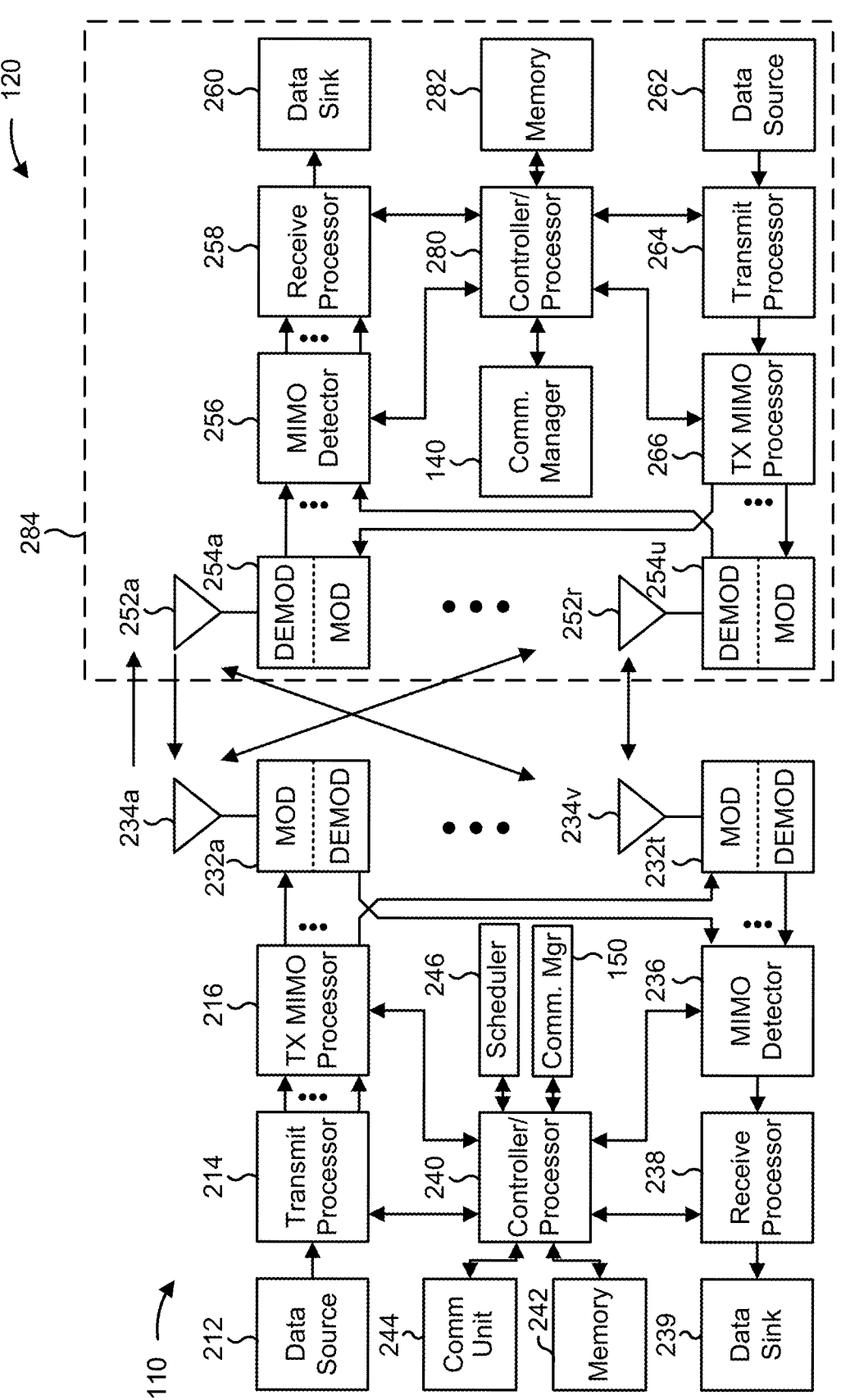
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor" or "a/the controller/processor," among other examples (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use downlink control information (DCI) to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a uplink control information (UCI) communication, a MAC control element (MAC-CE) communication, an RRC communication, or another type of uplink communication. Uplink signals may be transmitted on a physical uplink shared channel (PUSCH), a physical uplink control channel (PUCCH), and/or another type of uplink channel. An uplink signal may carry one or more transport blocks (TBs) of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range. The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal.

The network node 110, the controller/processor 240 of the network node 110, the UE 120, the controller/processor 280 of the UE 120, a CU, a DU, an RU, or any other component(s) of FIG. 1 or 2 may implement one or more techniques or perform one or more operations associated with a phase sweeping procedure for ambient IoT devices, as described in more detail elsewhere herein. For example, the controller/processor 240 of the network node 110, the controller/processor 280 of the UE 120, any other component(s) of FIG. 2, the CU, the DU, or the RU may perform or direct operations of, for example, process 1100 of FIG. 11, process 1200 of FIG. 12, or other processes as described herein (alone or in conjunction with one or more other processors). The memory 242 may store data and program codes for the network node 110, the network node 110, the CU, the DU, or the RU. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU, the DU, or the RU, may cause the one or more processors to perform process 1100 of FIG. 11, process 1200 of FIG. 12, or other processes as described herein. In some examples, executing instructions may include running the instructions, converting the instructions, compiling the instructions, and/or interpreting the instructions, among other examples. In some aspects, the ambient IoT device described herein is the UE 120, is included in the UE 120, or includes one or more components of the UE 120 shown in FIG. 2.

In some aspects, the ambient IoT device includes means for receiving, in accordance with a phase sweeping procedure, a signal that is a combination of a first signal transmitted by a first network node at a first phase and one or more second signals transmitted by one or more second network nodes at one or more second phases; and/or means for transmitting an indication of the one or more second phases in accordance with a received signal power. In some aspects, the means for the ambient IoT device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for coordinating a phase sweeping procedure in which a first network node transmits a first signal at a first phase and one or more second network nodes transmit a plurality of second signals at a plurality of second phases; and/or means for receiving an indication of one or more second phases, of the plurality of second phases, in accordance with a received signal power associated with an ambient IoT device. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

FIG. 3 is a diagram illustrating an example 300 associated with backscatter communications, in accordance with the present disclosure.

Some wireless communication devices may be considered IoT devices, such as ambient IoT devices (sometimes referred to as ultra-light IoT devices), or similar IoT devices. In ambient IoT, a terminal (for example, an RFID device, a tag, or a similar device) may not include a battery, and the terminal may accumulate energy from radio signaling. To achieve further cost reduction and zero-power communication, wireless networks may utilize a type of ambient IoT device referred to as an "ambient backscatter device" or a "backscatter device."

As shown in FIG. 3, a backscatter device 305 (for example, a tag or a sensor, among other examples), which may be one example of an ambient IoT device, may employ a simplified hardware design (for example, including a power splitter, an energy harvester, and a microcontroller) that does not include a battery, such that the backscatter device 305 relies on energy harvesting for power, and that does not include a radio wave generation circuit, such that the backscatter device 305 is capable of transmitting information only by reflecting a radio wave. More particularly, the backscatter device 305 communicates with a reader 308 (for example, a UE 120, a network node 110, or another network device) by modulating a reflecting radio signal from a RF source 310 (for example, a network node 110, a UE 120, or another network device). In some examples, the RF source 310 and the reader 308 may be the same device and/or may be co-located. For example, in some instances, the reader 308 and the RF source 310 may be associated with the same network node 110.

To facilitate communication of the backscatter device 305, the RF source 310 may transmit an energy harvesting wave to the backscatter device 305. The energy harvesting wave may be transmitted for a sufficient duration in order to enable a communication phase for a target range between the reader 308 and the backscatter device 305. Additionally or alternatively, in some instances, a range between the RF source 310 and the backscatter device 305 may be limited by a minimum received power for triggering energy harvesting at the backscatter device 305, such as −20 decibel milliwatts (dBm).

Once energy is sufficiently accumulated at the backscatter device 305, the backscatter device 305 may begin to reflect the radio wave that is radiated onto the backscatter device 305 via a backscatter link 315. For example, the RF source 310 may initiate a communication session (sometimes referred to as a query-response communication) with a query, which may be a modulating envelope of a continuous wave (CW). The backscatter device 305 may respond by backscattering of the CW. The communication session may include multiple rounds, such as for purposes of contention resolution when multiple backscatter devices respond to a query. A channel between the RF source 310 and the backscatter device 305 of the backscatter link 315 may be associated with a first backscatter link channel response value (sometimes referred to as a first backscatter link channel coefficient or a first backscatter link gain value), hBD. As described below, the backscatter device 305 may have reflection-on periods and reflection-off periods that follow a pattern that is based at least in part on the transmission of information bits by the backscatter device 305. The reader 308 may detect the reflection pattern of the backscatter device 305 and obtain the backscatter communication information via the backscatter link 315. A channel between the reader 308 and the backscatter device 305 of the backscatter link 315 may be associated with a second backscatter link channel response value (sometimes referred to as a second backscatter link channel coefficient or a second backscatter link channel gain value), hDU. In addition, the RF source 310 and the reader 308 may communicate (for example, reference signals and/or data signals) via a direct link 320. A channel between the RF source 310 and the reader 308 of the direct link 320 may be associated with a direct link channel response value (sometimes referred to as a direct link channel coefficient or a direct link channel gain value), hBU.

The backscatter device 305 may use an information modulation scheme, such as amplitude shift keying (ASK) modulation or on-off keying (OOK) modulation. For ASK or OOK modulation, the backscatter device 305 may switch on reflection when transmitting an information bit "1" and switch off reflection when transmitting an information bit "0." In backscatter communication, the RF source 310 may transmit a particular radio wave (for example, a reference signal or a data signal, such as a physical downlink shared channel (PDSCH)), which may be denoted as x(n). The reader 308 may receive this radio wave, x(n), directly from the RF source 310 via the direct link 320, as well as from the backscatter device 305 modulating and reflecting the radio wave to the reader 308 via the backscatter link 315. The signal received at the reader 308 via the direct link 320, indicated by reference number 325, is the product of the radio wave transmitted by the RF source 310, x(n), multiplied by the direct link channel response value, hBU, plus any signal noise. The information bits signal of the backscatter device 305 may be denoted as s(n) where $s(n) \in \{0,1\}$. Accordingly, the signal received at the reader 308 via the backscatter link 315, indicated by reference number 330, is the product of the signal transmitted by the RF source 310, x(n), multiplied by the first backscatter link channel response value, hBD, the second backscatter link channel response value, hDU, the information bits signal from the backscatter device 305, s(n), and a reflection coefficient associated with the backscatter device 305 plus any noise.

Thus, the resulting signal received at the reader 308, which is the superposition of the signal received via the direct link 320 and the signal received via the backscatter link 315, may be denoted as y(n). This signal, y(n), is shown by reference number 335. As shown, when s(n)=0 (indicated by reference number 340 in the plot shown at reference number 330), the backscatter device 305 may switch off reflection, and thus the reader 308 receives only the direct link 320 signal. When s(n)=1 (indicated by reference number 345 in the plot shown at reference number 330), the backscatter device 305 may switch on reflection, and thus the reader 308 receives a superposition of both the direct link

320 signal and the backscatter link 315 signal. To receive the information bits transmitted by the backscatter device 305, the reader 308 may first decode x(n) based at least in part on the direct link channel response value of h_BU (n) by treating the backscatter link 315 signal as interference. The reader 308 may then detect the existence of the signal component. In some instances, the backscatter device 305 may not maintain a state from communication session to communication session except of what is stored in the backscatter device 305 memory, such as an electronic product code (EPC) associated with backscatter device 305 or similar information.

Figure 4:
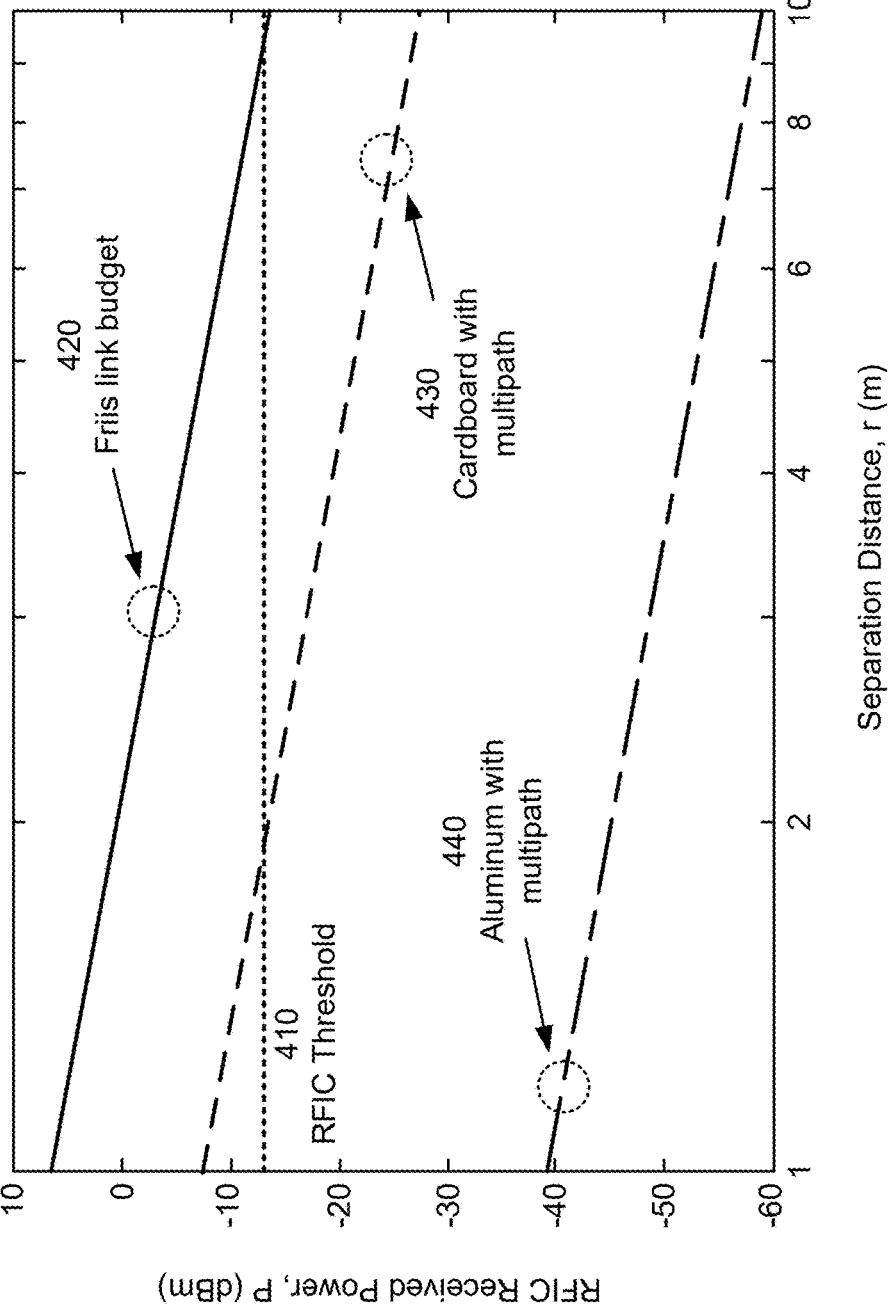
FIG. 4 illustrates an example of wireless power transfer for ambient internet of things (IoT) devices, in accordance with the present disclosure.

FIG. 4 illustrates an example 400 of wireless power transfer for ambient IoT devices, in accordance with the present disclosure.

Example 400 shows a plot of received power of a signal received at an RF integrated circuit (RFIC) of an ambient IoT device over a separation distance between the ambient IoT device and a transmitter of the signal. In some examples, the ambient IoT device may receive the signal over a power link (or a downlink or a reader-to-tag link, among other examples), which may be a bottleneck link. The plot includes an RFIC threshold 410, a Friis link budget 420, received power under multipath propagation conditions in an environment containing cardboard (shown as cardboard with multipath 430), and received power under multipath propagation conditions in an environment containing aluminum (shown as aluminum with multipath 440).

The RFIC threshold 410 may be relatively high (for example, approximately −13 dBm). In some examples, power harvesting circuitry of the RFIC may be unable to use a signal having an input power below the RFIC threshold 410 to harvest sufficient energy from the signal. In some examples, lower input power (for example, at or below −20 dBm) may be insufficient to ensure satisfactory cost and conversion efficiency (for example, below 1%).

The Friis link budget 420 may be the received power of the signal under ideal conditions (for example, as computed by the Friis transmission equation). As shown, the range of wireless power transfer for ambient IoT devices in the Friis link budget 420 may be limited to a few meters (for example, 10 meters) due to insufficient link budget. Cardboard with multipath 430 and aluminum with multipath 440 demonstrate how reflections involving multipath propagation can exacerbate fading of the energy signal and further degrade the range of wireless power transfer.

Figure 5:
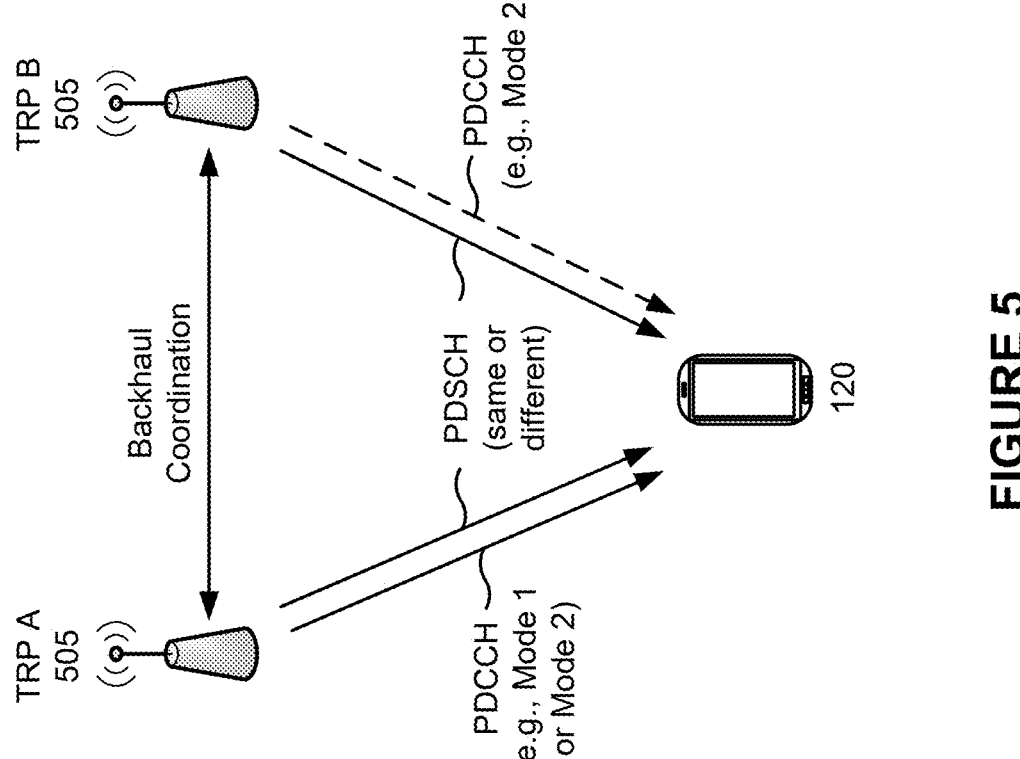
FIG. 5 is a diagram illustrating an example of communication using multiple transmission reception points (TRPs), in accordance with the present disclosure.

FIG. 5 is a diagram illustrating an example 500 of multi-TRP communication (sometimes referred to as multi-panel communication), in accordance with the present disclosure.

As shown in FIG. 5, multiple TRPs 505 may communicate with the same UE 120. The multiple TRPs 505 (shown as TRP A and TRP B) may communicate with the same UE 120 in a coordinated manner (for example, using coordinated multipoint transmissions) to improve reliability and/or increase throughput. The TRPs 505 may coordinate such communications via an interface between the TRPs 505 (for example, a backhaul interface and/or an access node controller). In a first multi-TRP transmission mode (for example, Mode 1), a single physical downlink control channel (PDCCH) may be used to schedule downlink data communications for a single PDSCH. In this case, multiple TRPs 505 (for example, TRP A and TRP B) may transmit communications to the UE 120 on the same PDSCH. In a second multi-TRP transmission mode (for example, Mode 2), multiple PDCCHs may be used to schedule downlink data communications for multiple corresponding PDSCHs (for example, one PDCCH for each PDSCH).

Figure 6:
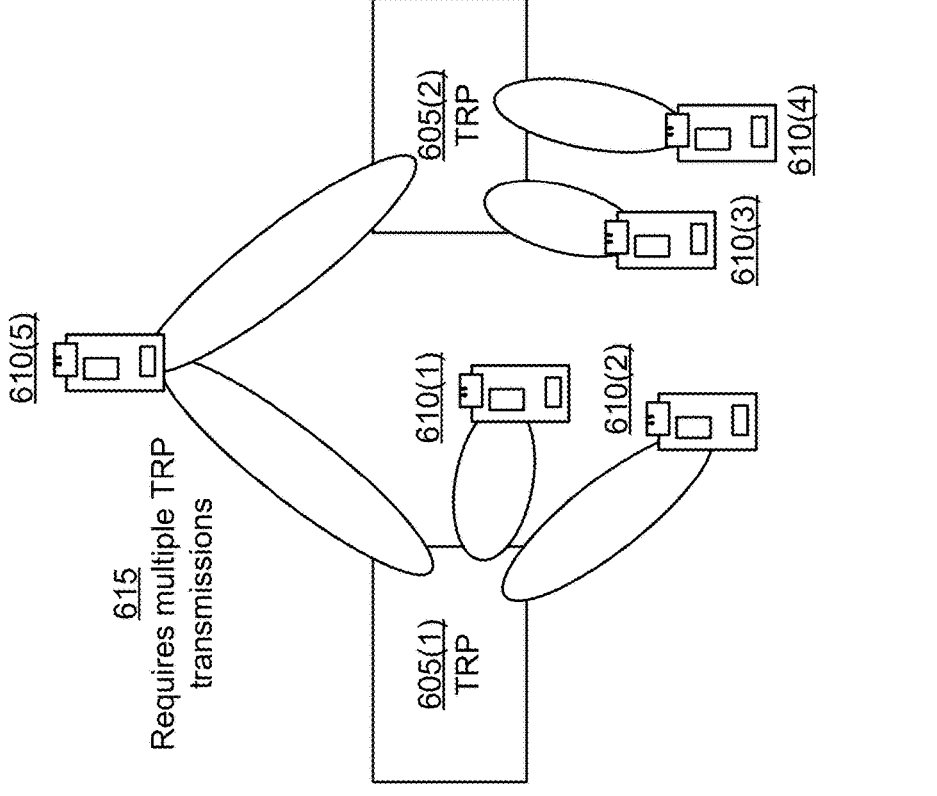
FIG. 6 illustrates an example associated with ambient IoT power transfer, in accordance with the present disclosure.

FIG. 6 illustrates an example 600 associated with ambient IoT power transfer, in accordance with the present disclosure.

Example 600 includes neighboring TRPs 605(1) and 605(2) and ambient IoT devices 610(1)-610(5). As shown, ambient IoT devices 610(1)-610(4) may be within a range of the TRP 605(1) or the TRP 605(2) that enables the ambient IoT devices 610(1)-610(4) to harvest sufficient energy from one of the TRP 605(1) or the TRP 605(2) (for example, without harvesting additional energy from the other of the TRP 605(1) or the TRP 605(2)). However, the ambient IoT device 610(5) may be positioned outside the range of TRP 605(1) and the TRP 605(2). For example, the ambient IoT device 610(5) may be a cell-edge tag.

In an operation 615, signals from the neighboring TRPs 605(1) and 605(2) may be coordinated (for example, coherently combined) such that the ambient IoT device 610(5) may receive a stronger signal, thereby improving coverage for power transfer. However, coherently combining the signals transmitted from TRPs 605(1) and 605(2) may involve estimating channel information (for example, channel phase information) from each of the TRPs 605(1) and 605(2) to the ambient IoT device 610(5). Without the channel phase information, the signals from the TRPs 605(1) and 605(2) may be combined at random phases, rather than phases that allow for coherent combining (for example, constructive interference).

Further complicating the channel estimation, the ambient IoT device 610(5) may provide information of the channel estimation by backscattering or actively transmitting a signal, but the ambient IoT device 610(5) may be unable to backscatter or actively transmit the signal without the coherently combined signal. For example, in the case where the ambient IoT device 610(5) is an energy-harvesting tag (for example, a passive tag), the ambient IoT device 610(5) may be unable to harvest the energy necessary to transmit the signal without the coherently combined signal. As a result, coverage for the ambient IoT device 610(5) may be unavailable.

Figure 7:
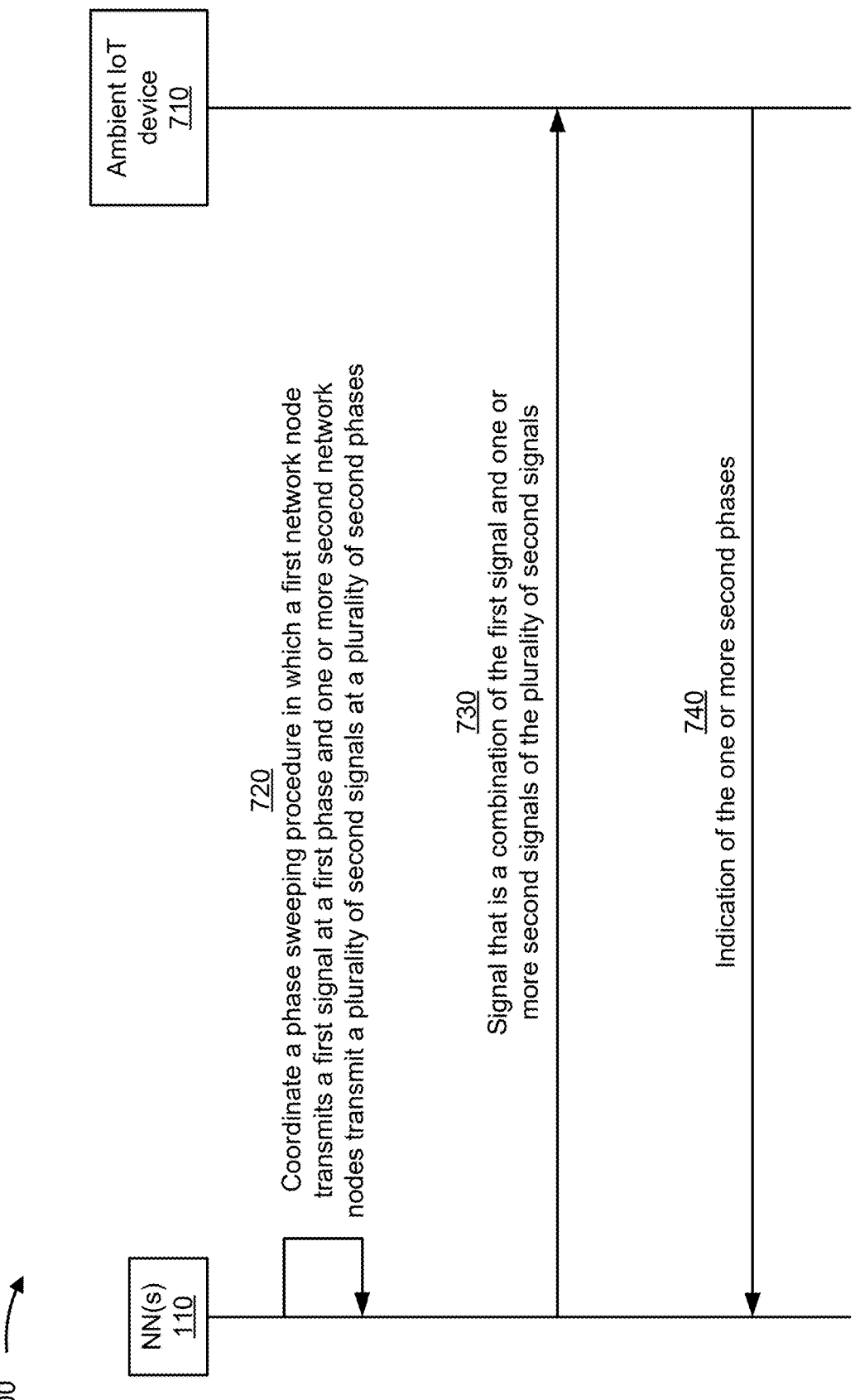
FIG. 7 is a diagram illustrating an example associated with a phase sweeping procedure for ambient IoT devices, in accordance with the present disclosure.

FIG. 7 is a diagram illustrating an example 700 associated with a phase sweeping procedure for ambient IoT devices, in accordance with the present disclosure. As shown in FIG. 7, a network node 110 and an ambient IoT device 710 may communicate with one another.

In a first operation 720, a network node 110 may coordinate a phase sweeping procedure in which a first network node 110 transmits a first signal at a first phase and one or more second network nodes 110 transmit a plurality of second signals at a plurality of second phases. The phase sweeping procedure may involve the first network node 110 transmitting the first signal at the first phase while the one or more second network nodes 110 transmit a plurality of second signals at a plurality of second phases.

In some examples, the phase sweeping procedure may involve the first network node 110 and a single second network node 110. For example, the phase sweeping procedure may involve the second network node 110 transmitting the plurality of second signals at the plurality of second phases. For example, the second signals transmitted by the second network node 110 may have respective second phases. In some examples, the phase sweeping procedure may involve the first network node 110 and a plurality of second network nodes 110, each transmitting at least one second signal having at least one of the second phases.

Coordinating the phase sweeping procedure may involve transmitting or receiving at least one control signal that indicates how the phase sweeping procedure is to be carried out. For example, the control signal may indicate one or more parameters (for example, timing parameters, frequency parameters, or phase parameters, among other examples) of the first signal and/or the one or more of the plurality of second signals. The network node 110 coordinating the phase sweeping procedure may be the first network node 110 that transmits the first signal, one of the one or more second network nodes 110 that transmit the plurality of second signals, or an independent network node that is neither the first network node 110 nor one of the one or more second network nodes 110.

The first signal and the plurality of second signals may be reference signals (RSs). In some examples, the first phase may be the same as one of the second phases. In some examples, the first phase may be different from all of the second phases. In some examples, any of the second phases may be the same as, or different from, any of the other second phases.

In a second operation 730, the ambient IoT device 710 may receive, in accordance with the phase sweeping procedure, a signal that is a combination of the first signal and one or more second signals of the plurality of second signals. The signal may be a combination of the first signal and a single second signal in a case where the phase sweeping procedure involves the first network node 110 and a single second network node 110. The signal may be a combination of the first signal and multiple second signals in a case where the phase sweeping procedure involves the first network node 110 and multiple second network nodes 110.

The phase sweeping procedure may produce a plurality of combined signals, where each combined signal is a combination of the first signal and at least one of the plurality of second signals. The signal received by the ambient IoT device 710 may be a coherent combination of the first signal and the one or more second signals. For example, the first signal and the one or more second signals may constructively interfere with each other to produce a signal of sufficient energy to be received by the ambient IoT device 710. In some examples, one or more of the combined signals may be non-coherent combinations (for example, via destructive, or non-constructive, interference) of the first signal and at least one second signal. Such non-coherently-combined signals may carry insufficient energy and, as a result, may not be received by the ambient IoT device 710.

In a case where the ambient IoT device 710 is configured for backscattering, each sweep parameter may persist for a minimum duration. For example, the one or more second network nodes 110 may transmit each of the second signals for a length of time that enables the ambient IoT device 710 to harvest sufficient energy for the backscattering (for example, the length of time may be long enough for the ambient IoT device 710 to first harvest energy from the combined, received signal and then backscatter the received signal). In a case where the ambient IoT device 710 is capable of actively transmitting the signal, the ambient IoT device 710 may harvest energy, use the harvested energy to decode the signal (for example, a reference signal), and then perform the active transmission.

In a third operation 740, the ambient IoT device 710 may transmit, and the network node 110 may receive, an indication of one or more second phases in accordance with a received signal power. The received signal power may be a received power (for example, received energy) of the signal at the ambient IoT device 710. For example, the ambient IoT device 710 may transmit, and the network node 110 may receive, the indication based at least in part on the received signal power satisfying a received signal power threshold (for example, a sensitivity threshold of the ambient IoT device 710). Based at least in part on the indication, the first network node 110 and the one or more second network nodes 110 may transmit subsequent communications for the ambient IoT device 710 using the first phase and the one or more second phases.

In a case where the phase sweeping procedure involves the first network node 110 and a single second network node 110, the ambient IoT device 710 may indicate the second phase of the second signal, transmitted by the single second network node 110, that coherently combined with the first signal. In a case where the phase sweeping procedure involves the first network node 110 and multiple second network nodes 110, the ambient IoT device 710 may indicate multiple second phase of multiple second signals, transmitted by the multiple second network nodes 110, that coherently combined with the first signal.

In some examples, the ambient IoT device 710, and any other ambient IoT devices transmitting respective indications, may transmit the indication in accordance with a random (or pseudorandom) frequency shift. As a result, the indications may be frequency-division-multiplexed and the probability of interference between the indications may be reduced.

In some aspects, the ambient IoT device 710 may transmit, responsive to the signal, a backscattered signal that contains an identification of the ambient IoT device 710. Additionally or alternatively, the network node 110 may receive the backscattered signal responsive to one or more second signals, of the plurality of second signals, that are associated with the one or more second phases. The one or more second signals may be associated with the one or more second phases in that the one or more second signals may coherently combine with the first signal to produce the signal.

The ambient IoT device 710 may transmit the backscattered signal responsive to the signal in that the ambient IoT device 710 may backscatter the signal. In some examples, the identification of the ambient IoT device 710 that is contained in the backscattered signal may be a tag identifier. The backscattered signal may contain any suitable information associated with the ambient IoT device 710.

In some aspects, the ambient IoT device 710 may transmit, and the network node 110 may receive, an indication of a combination of the first signal and the one or more second signals. In some examples, the ambient IoT device 710 may transmit the indication responsive to the signal. Additionally or alternatively, the network node 110 may receive the indication responsive to the one or more second signals. For example, the ambient IoT device 710 may measure the signal and report, to the network node 110, the first network node 110, or one of the one or more second network nodes 110, the combination of the first signal and the one or more second signals. For example, the ambient IoT device 710 may measure multiple signals of the phase sweeping procedure, including the signal, and report a best combination of signals (for example, the combination that produces the highest received signal power).

In some examples, the indication of the combination of the first signal and the one or more second signals may serve as a selection of the combination of the first signal and the one or more second signals. In some examples, the indication may include a signal that indicates one or more sweeping parameters (for example, parameters that enable the network node 110 to identify the combination of the first signal and the one or more second signals, such as a time at which the signal was received).

In some aspects, the phase sweeping procedure includes the one or more second network nodes 110 transmitting, responsive to the indication of one or more second phases, a plurality of third signals at a plurality of third phases that are higher-resolution than the plurality of second phases. For example, the first network node 110 transmitting the first signal at the first phase and the one or more second network nodes 110 transmitting the plurality of second signals at the plurality of second phases may be a first stage of the phase sweeping procedure, and the one or more second network nodes 110 transmitting the plurality of third signals at the plurality of third phases may be a second stage of the phase sweeping procedure. The first stage of the phase sweeping procedure may involve lower-resolution phase sweeps, and the second stage of the phase sweeping procedure may involve higher-resolution phase sweeps.

The plurality of third phases may be higher-resolution than the plurality of second phases in that a difference between at least two consecutive third phases may be less than a difference between at least two consecutive second phases. The plurality of third phases may be higher-resolution than the plurality of second phases if at least one difference between the third phases is less than at least one difference between the second phases or if every difference between the third phases is less than every difference between the second phases, among other examples. In some examples, the differences between the second phases may be constant, and/or the differences between the third phases may be constant.

For example, during the first phase, a second network node 110 may transmit four signals (for example, the second signals) at phases of 0°, 90°, 180°, and 270°, respectively. The ambient IoT device 710 may transmit, and the network node 110 may receive, an indication of the one or more second phases (for example, 90°). For example, the ambient IoT device 710 may indicate that the signal transmitted at the 90° phase, in combination with the first signal, provides a highest received signal power.

Because the ambient IoT device 710 indicated that the signal transmitted at the 90° phase, in combination with the first signal, provides a highest received signal power, the second network node 110 may perform a higher-resolution phase sweep centered around the 90° phase. For example, during the second phase, the second network node 110 may transmit three signals (for example, the third signals) at phases of 45°, 90°, 135°, respectively. In this example, the third phases are higher resolution than the second phases because the difference between consecutive third phases is 45°, whereas the difference between consecutive second phases is 90°.

The ambient IoT device 710 may provide another indication based at least in part on the second stage of the phase sweep procedure. For example, the other indication may indicate that the 45° phase, in combination with the first signal, provides a highest received signal power. Accordingly, the second network node 110 may transmit subsequent communications for the ambient IoT device 710 using the 45° phase (for example, in combination with the first network node 110 transmitting subsequent communications using the first phase).

In some aspects, the ambient IoT device 710 may transmit, and the network node 110 may receive, a triggering indication associated with the phase sweeping procedure. The triggering indication may be associated with the phase sweeping procedure in that the triggering indication may trigger the first network node 110 and the one or more second network nodes to perform the phase sweeping procedure. The ambient IoT device 710 may transmit the triggering indication based at least in part on a received signal power (for example, energy detected from a non-combined signal transmitted by a single network node) not satisfying a received signal power threshold. Thus, using the triggering indication, the ambient IoT device 710 may request the network node 110, the first network node 110, and/or the one or more second network nodes 110 to perform the phase sweeping procedure.

Figure 8:
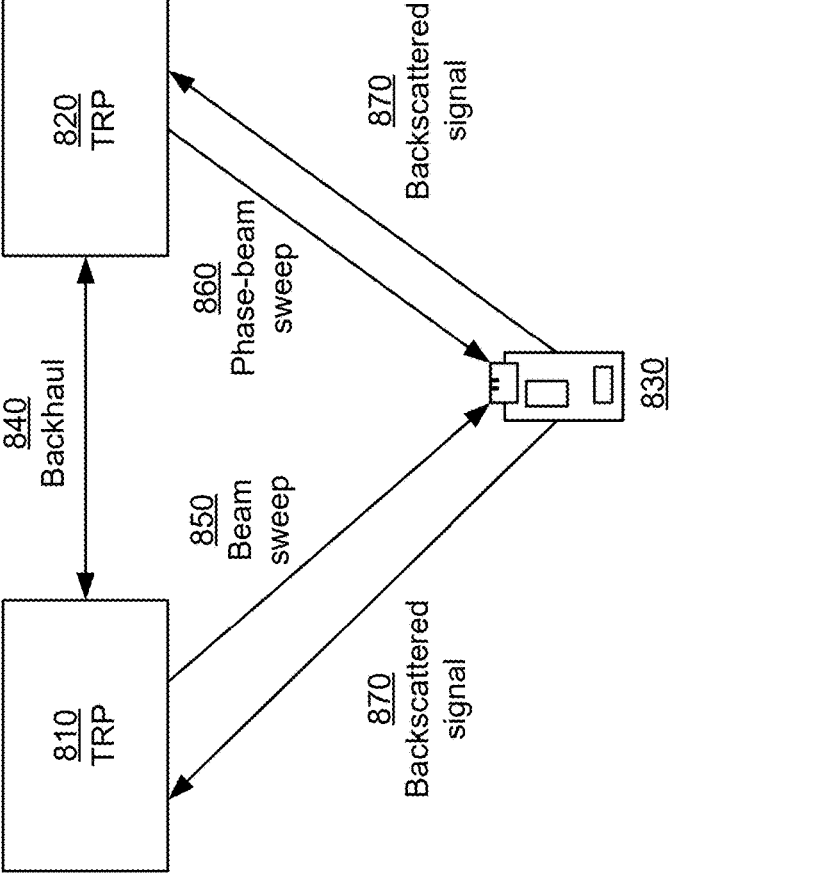
FIG. 8 is a diagram illustrating an example associated with TRPs, in accordance with the present disclosure.

FIG. 8 is a diagram illustrating an example 800 associated with TRPs, in accordance with the present disclosure.

Example 800 includes a first TRP 810, a second TRP 820, and an ambient IoT device 830. In some aspects, the first network node 110 may be the first TRP 810, and the one or more second network nodes 110 may be the second TRP 820. In this example, the network node 110 that coordinates the phase sweeping procedure and receives the indication of the one or more second phases may be the first TRP 810 (for example, the network node 110 may be the first network node 110). For example, the ambient IoT device 830 may be assigned to the first TRP 810, and, as a result, the first TRP 810 may be responsible for coordinating the phase sweeping procedure. The first TRP 810 and the second TRP 820 may be neighboring TRPs.

The first TRP 810 may coordinate the phase sweeping procedure with the second TRP 820 over a backhaul 840. In some aspects, the phase sweeping procedure may be a beam-phase sweeping procedure. In the beam-phase sweeping procedure, the first network node 110 (for example, the first TRP 810) may transmit a plurality of first signals, including the first signal, via a plurality of first beams and the one or more second network nodes 110 (for example, the second TRP 820) may transmit the plurality of second signals via a plurality of second beams.

In a first operation 850, the beam-phase sweeping procedure may involve the first TRP 810 sweeping multiple beams (for example, all possible beams). For example, the first TRP 810 may transmit the first signals in respective beams. In a second operation 860, for each transmission of the first signal in a first beam, the second TRP 820 may transmit, in each of the second beams, the second signals at respective phases. For example, for each beam selected by the first TRP 810, the second TRP 820 may sweep multiple beams (for example, all possible beams) and multiple phases. The first TRP 810 and the second TRP 820 may perform the beam-phase sweeping procedure in a system frame number (SFN) manner (for example, with the first TRP 810 and the second TRP 820 transmitting signals in the same time-frequency resources), which may improve the power transfer range.

The ambient IoT device 830 may receive a coherently combined signal during the beam-phase sweeping procedure (for example, during a beam sweep). In a third operation 870, the ambient IoT device 830 may backscatter the signal. The ambient IoT device 830 may backscatter any such coherently combined signals for which the received signal power (for example, received energy) is higher than a received signal power threshold (for example, a sensitivity of the ambient IoT device 830). The first TRP 810 and/or the second TRP 820 may measure the backscattered signal and identify a best beam-phase sweep combination (for example, the combination of signals, transmitted during the beam-phase sweeping procedure, that resulted in a highest received signal power at the ambient IoT device 830).

Additionally or alternatively, the ambient IoT device 830 may actively transmit the best beam-phase sweep combination.

In some examples, the beam-phase sweeping procedure may involve a first phase in which the first TRP 810 and/or the second TRP 820 sweep over lower-resolution beams (for example, wide beams) and a second phase in which the first TRP 810 and/or the second TRP 820 sweep, based at least in part on an indication of a best beam-phase sweep combination for the lower-resolution beams, over higher-resolution beams (for example, narrow beams centered around the best wide beam(s)). Additionally or alternatively, the beam-phase sweeping procedure may involve a plurality of second TRPs, including the second TRP 820, that perform beam-phase sweeping in concert with the beam sweeping of the first TRP.

Although example 800 shows the first TRP 810 transmitting the first signals and receiving the backscattered signal, in other examples, the first TRP 810 may transmit the first signals and not receive the backscattered signal. In these examples, the second TRP 820 may receive the backscattered signal. The first TRP 810 transmitting the first signals and not receiving the backscattered signal may alleviate self-interference resulting from backscattering (for example, transmit signal being backscattered by one or more ambient IoT devices and mixing with receive signals) in cases where the first TRP 810 is full-duplex-capable.

FIG. 9 is a diagram illustrating an example 900 associated with a beam sweeping procedure, in accordance with the present disclosure.

As shown, the first TRP 810 and the second TRP 820 may perform respective single-TRP beam sweeps 910 and 920. A single-TRP beam sweep may involve a TRP transmitting a plurality of signals (for example, reference signals) over a plurality of beams. One or ambient IoT devices may respond to various signals, which may enable the TRP to identify which of the beam(s) are suitable for communicating with the one or more ambient IoT devices. After performing the single-TRP beam sweeps 910 and 920, the first TRP 810 and the second TRP 820 may perform respective multi-TRP beam sweeps 930 and 940. For example, the TRP 810 and the second TRP 820 may perform the multi-TRP beam sweeps 930 and 940 in accordance with the beam-phase sweep procedure described herein. The multi-TRP beam sweeps 930 and 940 may involve greater time resources than the single-TRP beam sweeps 910 and 920.

In some aspects, the first TRP 810 may transmit a plurality of signals, in accordance with a beam sweeping procedure, that contain timing information associated with the phase sweeping procedure (for example, the beam-phase sweeping procedure). The timing information may indicate when the beam-phase sweeping procedure is scheduled to occur. The ambient IoT devices that are covered by the single-TRP beam sweeps 910 or 920 may receive the timing information and, using the timing information, refrain from responding to any signals detected during the beam-phase sweeping procedure. The ambient IoT devices that are not covered by the single-TRP beam sweeps 910 or 920 may not receive the timing information and, therefore, may respond to any signals detected during the beam-phase sweeping procedure. The ambient IoT devices that are covered by the single-TRP beam sweeps 910 and/or 920 may continue to use the reference signals detected during the single-TRP beam sweeps 910 and/or 920 and may harvest energy from the multi-TRP beam sweeps 930 and 940.

In some aspects, a periodicity associated with the phase sweeping procedure (for example, the beam-phase sweeping procedure) may be greater (for example, higher) than a periodicity associated with the beam sweeping procedure. A periodicity may be associated with a sweeping procedure in that the sweeping procedure may occur periodically according to the periodicity. The periodicity associated with the beam sweeping procedure may be a periodicity of the single-TRP beam sweeps 910 and/or 920, and the periodicity associated with the phase sweeping procedure may be a periodicity of the multi-TRP beam sweeps 930 and 940. The periodicity associated with the phase sweeping procedure may support at least a minimum update rate for the ambient IoT devices.

Additionally or alternatively, an ambient IoT device may trigger the multi-TRP beam sweeps 930 and 940 (for example, using a triggering indication described herein). For example, the ambient IoT device may trigger (for example, request) the first TRP 810 and/or the second TRP 820 to perform the multi-TRP beam sweeps 930 and 940 upon detecting a received signal power (for example, energy) from a single-TRP beam sweeps 910 or 920 that is lower than a received signal power threshold.

FIG. 10 is a diagram illustrating an example 1000 associated with wireless energy transmitters (WETs), in accordance with the present disclosure.

Example 1000 includes a first WET 1010, a second WET 1020, an ambient IoT device 1030, and a network node 110. A WET may be relatively simple devices capable of transmit CWs (for example, rather than using beams). WETs may be deployed in higher densities than TRPs, which may enable higher-density coverage. In some aspects, the first network node 110 may be the first WET 1010, and the one or more second network nodes 110 may be the second WET 1020. In this example, the network node 110 that coordinates the phase sweeping procedure and receives the indication of the one or more second phases may be the network node 110 (for example, a gNB).

In a first operation 1040, the network node 110 may coordinate the phase sweeping procedure by selecting a plurality of second phases at which the second WET 1020 is to transmit a plurality of second signals while the first WET 1010 is transmitting a first signal at a first phase. Additionally or alternatively, the network node 110 may indicate, to the second WET 1020, other information for the transmission of the second signals, such as timing information or frequency information, among other examples. Additionally or alternatively, the network node 110 may indicate, to the first WET 1020, information for the transmission of the first signal, such as timing information or frequency information, among other examples. The network node 110 may indicate a well-defined order of phase sweeping among the first WET 1010 and the second WET 1020.

In a second operation 1050, the first WET 1010 may transmit the first signal, which may be a fixed-phase CW signal. In a third operation 1060, the second WET 1020 may perform a phase sweep of the CW while the first WET 1010 is transmitting the first signal. In some examples, the second WET 1020 may perform a phase sweep for each phase of the first WET 1010.

The phase sweep may enable the ambient IoT device 1030 to receive a coherently combined signal. In a fourth operation 1070, the ambient IoT device 1030 may backscatter the coherently combined signal. In some examples, the ambient IoT device 1030 may backscatter one or more signals over multiple phase sweeps. The network node 110 may receive the backscattered signal, measure the received signal power, and identify a best phase sweep combination. For example, the network node 110 may use the information that the network node 110 transmits to the first WET 1010 and/or the second WET 1020 discussed above in connection with the first operation 1040 to perform the measurement and identify the best phase sweep combination. For example, the network node 110 may use the time at which the network node 110 receives the backscattered signal to identify the corresponding phase sweep combination.

The network node 110 may inform the first WET 1010 and/or the second WET 1020 regarding the best phase sweep combination. For example, the first WET 1010 and/or the second WET 1020 may not have full duplex capability but may decode a few bits of information received from the network node 110 and select, from the bits of information, the best phase(s) for the ambient IoT device 1030. Subsequent signals transmitted at the best signal phase(s) from the first WET 1010 and/or the second WET 1020 to the ambient IoT device 1030 may coherently combine, and may therefore be detectable, by the ambient IoT device 1030.

The phase sweeping procedure described herein may provide an RS and signaling scheme that helps to ensure that ambient IoT devices can receive coherently combined signals. For example, the phase sweeping procedure may enable the network node to estimate channel information (for example, channel phase information) for the ambient IoT devices. For example, the network node may identify at least one combination of phases from the phase sweeping procedure that are coherently combined at an ambient IoT device. As a result, coverage of the ambient IoT devices (for example, cell-edge ambient IoT devices) may be improved.

The phase sweeping procedure including the one or more second network nodes transmitting, responsive to the indication of one or more second phases, a plurality of third signals at a plurality of third phases that are higher-resolution than the plurality of second phases may decrease total sweep time (for example, beam-phase sweep time) or improve power transfer efficiency, among other examples. For example, the phase sweeping procedure may avoid Transmitting a plurality of signals, in accordance with a beam sweeping procedure, that contain timing information associated with the phase sweeping procedure may reduce a quantity of ambient IoT devices that respond to the phase sweeping procedure. As a result, ambient IoT devices that can be supported by non-coherent-combined signals may not interfere with ambient IoT devices that cannot supported by non-coherent-combined signals. For example, the timing information may enable one or more network nodes to detect an identification of cell-edge ambient IoT devices.

The periodicity associated with the phase sweeping procedure being greater than the periodicity associated with the beam sweeping procedure may conserve power or overhead, among other examples. For example, the phase sweeping procedure may support a quantity of cell-edge ambient IoT devices that is less than a quantity of non-cell-edge ambient IoT devices that is supported by the beam sweeping procedure. Therefore, the phase sweeping procedure may occur less frequently than the beam sweeping procedure. Additionally or alternatively, the triggering indication associated with the phase sweeping procedure may enable time-sensitive ambient IoT devices to receive connectivity faster than the periodicity associated with the phase sweeping procedure would allow.

Figure 11:
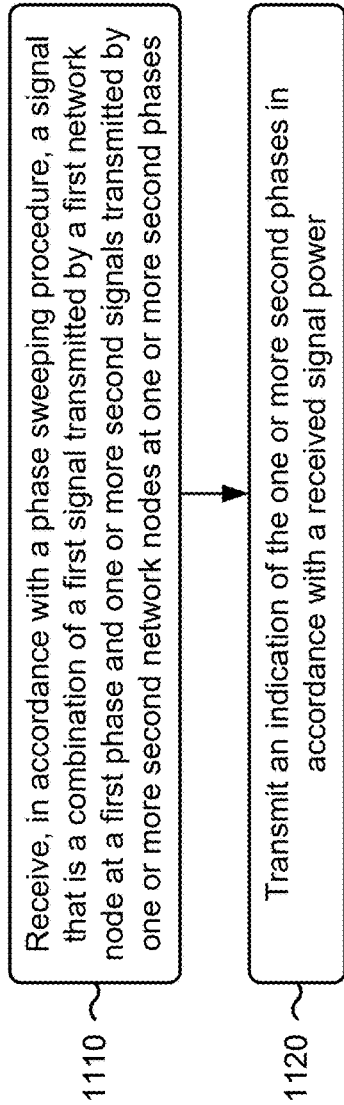
FIG. 11 is a flowchart illustrating an example process performed, for example, at an ambient IoT device or an apparatus of an ambient IoT device that supports a phase sweeping procedure for ambient IoT devices, in accordance with the present disclosure.

FIG. 11 is a flowchart illustrating an example process 1100 performed, for example, at an ambient IoT device or an apparatus of an ambient IoT device that supports a phase sweeping procedure for ambient IoT devices, in accordance with the present disclosure. Example process 1100 is an example where the apparatus or the ambient IoT device (for example, UE 120) performs operations associated with a phase sweeping procedure for ambient IoT devices.

As shown in FIG. 11, in some aspects, process 1100 may include receiving, in accordance with a phase sweeping procedure, a signal that is a combination of a first signal transmitted by a first network node at a first phase and one or more second signals transmitted by one or more second network nodes at one or more second phases (block 1110). For example, the ambient IoT device (such as by using communication manager 140 or reception component 1302, depicted in FIG. 13) may receive, in accordance with a phase sweeping procedure, a signal that is a combination of a first signal transmitted by a first network node at a first phase and one or more second signals transmitted by one or more second network nodes at one or more second phases, as described above.

As further shown in FIG. 11, in some aspects, process 1100 may include transmitting an indication of the one or more second phases in accordance with a received signal power (block 1120). For example, the ambient IoT device (such as by using communication manager 140 or transmission component 1304, depicted in FIG. 13) may transmit an indication of the one or more second phases in accordance with a received signal power, as described above.

Process 1100 may include additional aspects, such as any single aspect or any combination of aspects described below or in connection with one or more other processes described elsewhere herein.

In a first additional aspect, the phase sweeping procedure is a beam-phase sweeping procedure.

In a second additional aspect, alone or in combination with the first aspect, transmitting the indication of the one or more second phases includes transmitting, responsive to the signal, a backscattered signal that contains an identification of the ambient IoT device.

In a third additional aspect, alone or in combination with one or more of the first and second aspects, transmitting the indication of the one or more second phases includes transmitting, responsive to the signal, an indication of the combination of the first signal and the one or more second signals.

In a fourth additional aspect, alone or in combination with one or more of the first through third aspects, process 1100 includes transmitting a triggering indication associated with the phase sweeping procedure.

In a fifth additional aspect, alone or in combination with one or more of the first through fourth aspects, the first network node is a first TRP, and the one or more second network nodes are one or more second TRPs.

In a sixth additional aspect, alone or in combination with one or more of the first through fifth aspects, the first network node is a first WET, and the one or more second network nodes are one or more second WETs.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

FIG. 12 is a flowchart illustrating an example process 1200 performed, for example, at a network node or an apparatus of a network node that supports a phase sweeping procedure for ambient IoT devices, in accordance with the present disclosure. Example process 1200 is an example where the apparatus or the network node (for example, network node 110) performs operations associated with a phase sweeping procedure for ambient IoT devices.

As shown in FIG. 12, in some aspects, process 1200 may include coordinating a phase sweeping procedure in which a first network node transmits a first signal at a first phase and one or more second network nodes transmit a plurality of second signals at a plurality of second phases (block 1210). For example, the network node (such as by using communication manager 150 or coordination component 1408, depicted in FIG. 14) may coordinate a phase sweeping procedure in which a first network node transmits a first signal at a first phase and one or more second network nodes transmit a plurality of second signals at a plurality of second phases, as described above.

As further shown in FIG. 12, in some aspects, process 1200 may include receiving an indication of one or more second phases, of the plurality of second phases, in accordance with a received signal power associated with an ambient IoT device (block 1220). For example, the network node (such as by using communication manager 150 or reception component 1402, depicted in FIG. 14) may receive an indication of one or more second phases, of the plurality of second phases, in accordance with a received signal power associated with an ambient IoT device, as described above.

Process 1200 may include additional aspects, such as any single aspect or any combination of aspects described below or in connection with one or more other processes described elsewhere herein.

In a first additional aspect, the phase sweeping procedure is a beam-phase sweeping procedure in which the first network node transmits a plurality of first signals, including the first signal, via a plurality of first beams and the one or more second network nodes transmit the plurality of second signals via a plurality of second beams.

In a second additional aspect, alone or in combination with the first aspect, receiving the indication of one or more second phases includes receiving, responsive to one or more second signals, of the plurality of second signals, that are associated with the one or more second phases, a backscattered signal that contains an identification of the ambient IoT device.

In a third additional aspect, alone or in combination with one or more of the first and second aspects, receiving the indication of one or more second phases includes receiving, responsive to one or more second signals, of the plurality of second signals, that are associated with the one or more second phases, an indication of a combination of the first signal and the one or more second signals.

In a fourth additional aspect, alone or in combination with one or more of the first through third aspects, the phase sweeping procedure includes the one or more second network nodes transmitting, responsive to the indication of one or more second phases, a plurality of third signals at a plurality of third phases that are higher-resolution than the plurality of second phases.

In a fifth additional aspect, alone or in combination with one or more of the first through fourth aspects, process 1200 includes transmitting a plurality of signals, in accordance with a beam sweeping procedure, that contain timing information associated with the phase sweeping procedure.

In a sixth additional aspect, alone or in combination with one or more of the first through fifth aspects, a periodicity associated with the phase sweeping procedure is greater than a periodicity associated with the beam sweeping procedure.

In a seventh additional aspect, alone or in combination with one or more of the first through sixth aspects, process 1200 includes receiving a triggering indication associated with the phase sweeping procedure.

In an eighth additional aspect, alone or in combination with one or more of the first through seventh aspects, the first network node is a first TRP, and the one or more second network nodes are one or more second TRPs.

In a ninth additional aspect, alone or in combination with one or more of the first through eighth aspects, the first network node is a first WET, and the one or more second network nodes are one or more second WETs.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
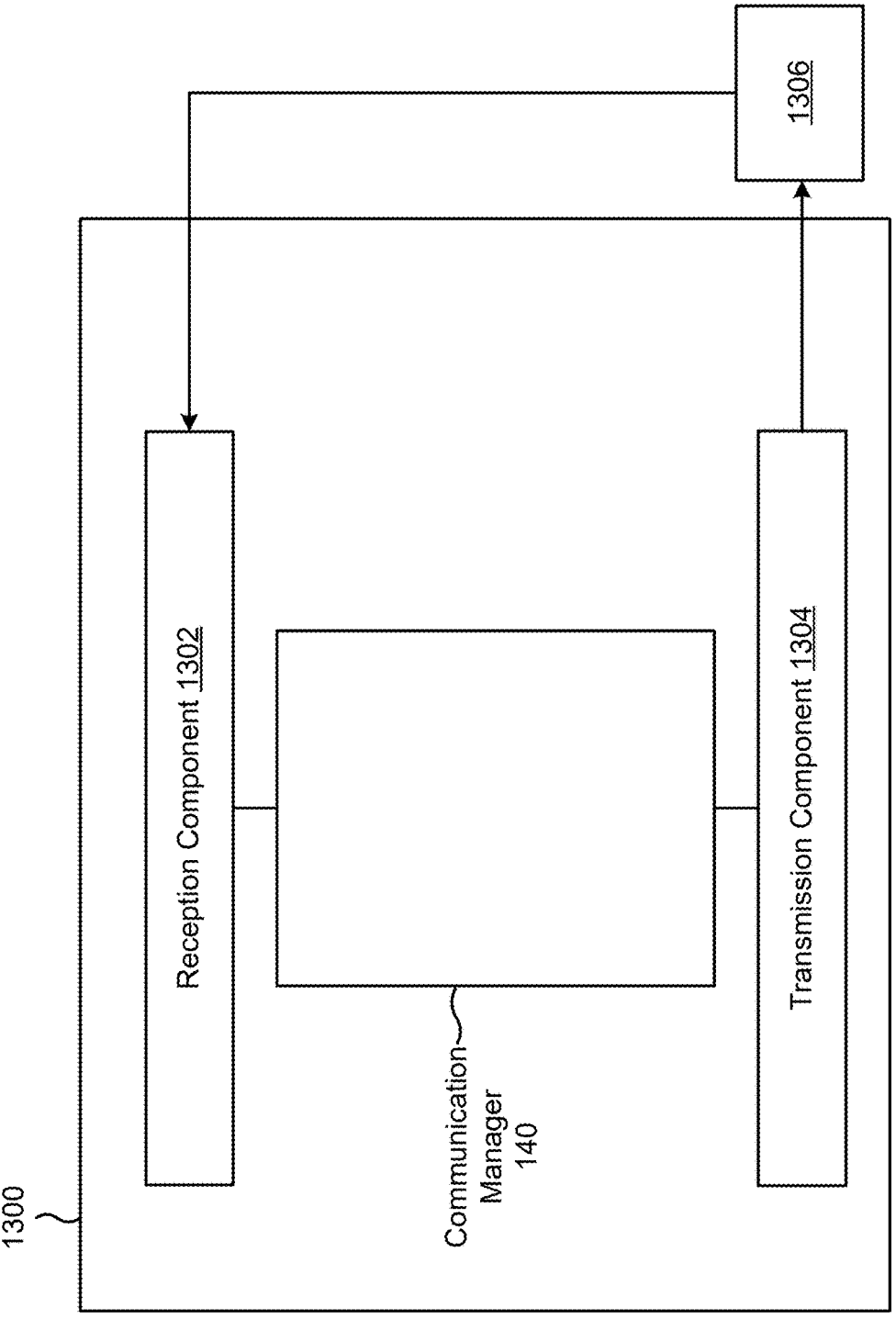
FIG. 13 is a diagram of an example apparatus, such as an ambient IoT device, for wireless communication that supports a phase sweeping procedure for ambient IoT devices, in accordance with the present disclosure.

FIG. 13 is a diagram of an example apparatus 1300 for wireless communication that supports a phase sweeping procedure for ambient IoT devices, in accordance with the present disclosure. The apparatus 1300 may be a ambient IoT device, or a ambient IoT device may include the apparatus 1300. In some aspects, the apparatus 1300 includes a reception component 1302, a transmission component 1304, and a communication manager 140, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to and/or operable to perform one or more operations described herein in connection with FIGS. 7-10. Additionally or alternatively, the apparatus 1300 may be configured to and/or operable to perform one or more processes described herein, such as process 1100 of FIG. 11. In some aspects, the apparatus 1300 may include one or more components of the ambient IoT device described above in connection with FIG. 2.

The reception component 1302 may receive communications, such as reference signals, control information, and/or data communications, from the apparatus 1306. The reception component 1302 may provide received communications to one or more other components of the apparatus 1300, such as the communication manager 140. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, one or more modems, one or more demodulators, one or more MIMO detectors, one or more receive processors, one or more controllers/processors, and/or one or more memories of the ambient IoT device described above in connection with FIG. 2.

The transmission component 1304 may transmit communications, such as reference signals, control information, and/or data communications, to the apparatus 1306. In some aspects, the communication manager 140 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, one or more modems, one or more modulators, one or more transmit MIMO processors, one or more transmit processors, one or more controllers/processors, and/or one or more memories of the ambient IoT device described above in connection with FIG. 2. In some aspects, the transmission component 1304 may be co-located with the reception component 1302 in one or more transceivers.

The communication manager 140 may receive or may cause the reception component 1302 to receive, in accordance with a phase sweeping procedure, a signal that is a combination of a first signal transmitted by a first network node at a first phase and one or more second signals transmitted by one or more second network nodes at one or more second phases. The communication manager 140 may transmit or may cause the transmission component 1304 to transmit an indication of the one or more second phases in accordance with a received signal power. In some aspects, the communication manager 140 may perform one or more operations described elsewhere herein as being performed by one or more components of the communication manager 140. The communication manager 140 may include one or more controllers/processors and/or one or more memories of the ambient IoT device described above in connection with FIG. 2.

The reception component 1302 may receive, in accordance with a phase sweeping procedure, a signal that is a combination of a first signal transmitted by a first network node at a first phase and one or more second signals transmitted by one or more second network nodes at one or more second phases. The transmission component 1304 may transmit an indication of the one or more second phases in accordance with a received signal power. In some aspects, the transmission component 1304 may transmit a triggering indication associated with the phase sweeping procedure.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
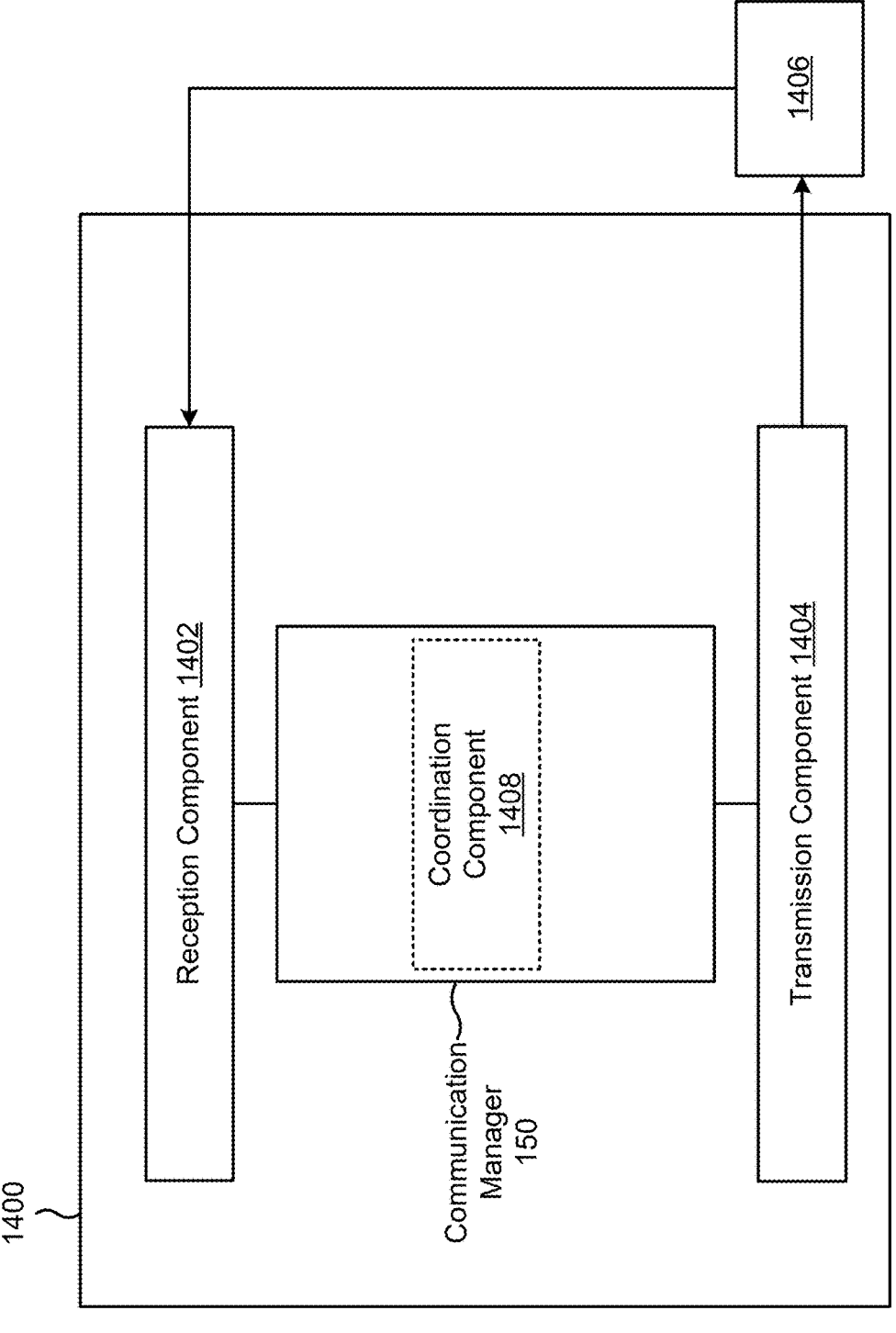
FIG. 14 is a diagram of an example apparatus, such as a network node, for wireless communication that supports a phase sweeping procedure for ambient IoT devices, in accordance with the present disclosure.

FIG. 14 is a diagram of an example apparatus 1400 for wireless communication that supports a phase sweeping procedure for ambient IoT devices, in accordance with the present disclosure. The apparatus 1400 may be a network node, or a network node may include the apparatus 1400. In some aspects, the apparatus 1400 includes a reception component 1402, a transmission component 1404, and a communication manager 150, which may be in communication with one another (for example, via one or more buses). As shown, the apparatus 1400 may communicate with another apparatus 1406 (such as a UE, a network node, or another wireless communication device) using the reception component 1402 and the transmission component 1404.

In some aspects, the apparatus 1400 may be configured to and/or operable to perform one or more operations described herein in connection with FIGS. 7-10. Additionally or alternatively, the apparatus 1400 may be configured to and/or operable to perform one or more processes described herein, such as process 1200 of FIG. 12. In some aspects, the apparatus 1400 may include one or more components of the network node described above in connection with FIG. 2.

The reception component 1402 may receive communications, such as reference signals, control information, and/or data communications, from the apparatus 1406. The reception component 1402 may provide received communications to one or more other components of the apparatus 1400, such as the communication manager 150. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, one or more modems, one or more demodulators, one or more MIMO detectors, one or more receive processors, one or more controllers/processors, and/or one or more memories of the network node described above in connection with FIG. 2.

The transmission component 1404 may transmit communications, such as reference signals, control information, and/or data communications, to the apparatus 1406. In some aspects, the communication manager 150 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 1404 may be co-located with the reception component 1402 in one or more transceivers.

The communication manager 150 may coordinate a phase sweeping procedure in which a first network node transmits a first signal at a first phase and one or more second network nodes transmit a plurality of second signals at a plurality of second phases. The communication manager 150 may receive or may cause the reception component 1402 to receive an indication of one or more second phases, of the plurality of second phases, in accordance with a received signal power associated with an ambient IoT device. In some aspects, the communication manager 150 may perform one or more operations described elsewhere herein as being performed by one or more components of the communication manager 150.

The communication manager 150 may include one or more controllers/processors, one or more memories, one or more schedulers, and/or one or more communication units of the network node described above in connection with FIG. 2. In some aspects, the communication manager 150 includes a set of components, such as a coordination component 1408. Alternatively, the set of components may be separate and distinct from the communication manager 150. In some aspects, one or more components of the set of components may include or may be implemented within one or more controllers/processors, one or more memories, one or more schedulers, and/or one or more communication units of the network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The coordination component 1408 may coordinate a phase sweeping procedure in which a first network node transmits a first signal at a first phase and one or more second network nodes transmit a plurality of second signals at a plurality of second phases. The reception component 1402 may receive an indication of one or more second phases, of the plurality of second phases, in accordance with a received signal power associated with an ambient IoT device.

In some aspects, the transmission component 1404 may transmit a plurality of signals, in accordance with a beam sweeping procedure, that contain timing information associated with the phase sweeping procedure. In some aspects, the reception component 1402 may receive a triggering indication associated with the phase sweeping procedure.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by an ambient IoT device, comprising: receiving, in accordance with a phase sweeping procedure, a signal that is a combination of a first signal transmitted by a first network node at a first phase and one or more second signals transmitted by one or more second network nodes at one or more second phases; and transmitting an indication of the one or more second phases in accordance with a received signal power.

Aspect 2: The method of Aspect 1, wherein the phase sweeping procedure is a beam-phase sweeping procedure.

Aspect 3: The method of any of Aspects 1-2, wherein transmitting the indication of the one or more second phases includes transmitting, responsive to the signal, a backscattered signal that contains an identification of the ambient IoT device.

Aspect 4: The method of any of Aspects 1-3, wherein transmitting the indication of the one or more second phases includes transmitting, responsive to the signal, an indication of the combination of the first signal and the one or more second signals.

Aspect 5: The method of any of Aspects 1-4, further comprising: transmitting a triggering indication associated with the phase sweeping procedure.

Aspect 6: The method of any of Aspects 1-5, wherein the first network node is a first TRP, and the one or more second network nodes are one or more second TRPs.

Aspect 7: The method of any of Aspects 1-6, wherein the first network node is a first WET, and the one or more second network nodes are one or more second WETs.

Aspect 8: A method of wireless communication performed by a network node, comprising: coordinating a phase sweeping procedure in which a first network node transmits a first signal at a first phase and one or more second network nodes transmit a plurality of second signals at a plurality of second phases; and receiving an indication of one or more second phases, of the plurality of second phases, in accordance with a received signal power associated with an ambient IoT device.

Aspect 9: The method of Aspect 8, wherein the phase sweeping procedure is a beam-phase sweeping procedure in which the first network node transmits a plurality of first signals, including the first signal, via a plurality of first beams and the one or more second network nodes transmit the plurality of second signals via a plurality of second beams.

Aspect 10: The method of any of Aspects 8-9, wherein receiving the indication of one or more second phases includes receiving, responsive to one or more second signals, of the plurality of second signals, that are associated with the one or more second phases, a backscattered signal that contains an identification of the ambient IoT device.

Aspect 11: The method of any of Aspects 8-10, wherein receiving the indication of one or more second phases includes receiving, responsive to one or more second signals, of the plurality of second signals, that are associated with the one or more second phases, an indication of a combination of the first signal and the one or more second signals.

Aspect 12: The method of any of Aspects 8-11, wherein the phase sweeping procedure includes the one or more second network nodes transmitting, responsive to the indication of one or more second phases, a plurality of third signals at a plurality of third phases that are higher-resolution than the plurality of second phases.

Aspect 13: The method of any of Aspects 8-12, further comprising: transmitting a plurality of signals, in accordance with a beam sweeping procedure, that contain timing information associated with the phase sweeping procedure.

Aspect 14: The method of Aspect 13, wherein a periodicity associated with the phase sweeping procedure is greater than a periodicity associated with the beam sweeping procedure.

Aspect 15: The method of any of Aspects 8-14, further comprising: receiving a triggering indication associated with the phase sweeping procedure.

Aspect 16: The method of any of Aspects 8-15, wherein the first network node is a first TRP, and the one or more second network nodes are one or more second TRPs.

Aspect 17: The method of any of Aspects 8-16, wherein the first network node is a first WET, and the one or more second network nodes are one or more second WETs.

Aspect 18: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 19: An apparatus for wireless communication at a device, the apparatus comprising one or more memories and one or more processors coupled to the one or more memories, the one or more processors configured to cause the device to perform the method of one or more of Aspects 1-17.

Aspect 20: An apparatus for wireless communication, the apparatus comprising at least one means for performing the method of one or more of Aspects 1-17.

Aspect 21: A non-transitory computer-readable medium storing code for wireless communication, the code comprising instructions executable by one or more processors to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

Aspect 23: A device for wireless communication, the device comprising a processing system that includes one or more processors and one or more memories coupled with the one or more processors, the processing system configured to cause the device to perform the method of one or more of Aspects 1-17.

Aspect 24: An apparatus for wireless communication at a device, the apparatus comprising one or more memories and one or more processors coupled to the one or more memories, the one or more processors individually or collectively configured to cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions. The term "identify" or "identifying" also encompasses a wide variety of actions and, therefore, "identifying" can include calculating, computing, processing, deriving, investigating, looking up (such as via looking up in a table, a database or another data structure), inferring, ascertaining, measuring, and the like. Also, "identifying" can include receiving (such as receiving information or receiving an indication), accessing (such as accessing data stored in memory), transmitting (such as transmitting information) and the like. Also, "identifying" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "of" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at an ambient internet of things (IoT) device, comprising:
one or more memories storing processor-executable code; and
one or more processors coupled with the one or more memories, at least one processor of the one or more processors configured to cause the ambient IoT device to:
receive, in accordance with a phase sweeping procedure, a signal that is a combination of a first signal transmitted by a first network node at a first phase and one or more second signals transmitted by one or more second network nodes at one or more second phases;
transmit an indication of the one or more second phases in accordance with a received signal power; and
transmit, responsive to the signal, a backscattered signal that contains an identification of the ambient IoT device.

2. The apparatus of claim 1, wherein the phase sweeping procedure is a beam-phase sweeping procedure.

3. The apparatus of claim 1, wherein the at least one processor of the one or more processors, to cause the ambient IoT device to transmit the indication of the one or more second phases, is configured to cause the ambient IoT device to transmit, responsive to the signal, an indication of the combination of the first signal and the one or more second signals.

4. The apparatus of claim 1, wherein at least one processor of the one or more processors is configured to cause the ambient IoT device to:
transmit a triggering indication associated with the phase sweeping procedure.

5. The apparatus of claim 1, wherein the first network node is a first transmission reception point (TRP), and the one or more second network nodes are one or more second TRPs.

6. The apparatus of claim 1, wherein the first network node is a first wireless energy transmitter (WET), and the one or more second network nodes are one or more second WETs.

7. An apparatus for wireless communication at a network node, comprising:
one or more memories storing processor-executable code; and
one or more processors coupled with the one or more memories, at least one processor of the one or more processors configured to cause the network node to:
coordinate a phase sweeping procedure in which a first network node transmits a first signal at a first phase and one or more second network nodes transmit a plurality of second signals at a plurality of second phases;
receive an indication of one or more second phases, of the plurality of second phases, in accordance with a received signal power associated with an ambient internet of things (IoT) device; and
receive, responsive to one or more second signals, of the plurality of second signals, that are associated with the one or more second phases, a backscattered signal that contains an identification of the ambient IoT device.

8. The apparatus of claim 7, wherein the phase sweeping procedure is a beam-phase sweeping procedure in which the first network node transmits a plurality of first signals, including the first signal, via a plurality of first beams and the one or more second network nodes transmit the plurality of second signals via a plurality of second beams.

9. The apparatus of claim 7, wherein the at least one processor of the one or more processors, to cause the network node to receive the indication of one or more second phases, is configured to cause the network node to receive, responsive to one or more second signals, of the plurality of second signals, that are associated with the one or more second phases, an indication of a combination of the first signal and the one or more second signals.

10. The apparatus of claim 7, wherein the phase sweeping procedure includes the one or more second network nodes transmitting, responsive to the indication of one or more second phases, a plurality of third signals at a plurality of third phases that are higher-resolution than the plurality of second phases.

11. The apparatus of claim 7, wherein at least one processor of the one or more processors is configured to cause the network node to:

transmit a plurality of signals, in accordance with a beam sweeping procedure, that contain timing information associated with the phase sweeping procedure.

12. The apparatus of claim 11, wherein a periodicity associated with the phase sweeping procedure is greater than a periodicity associated with the beam sweeping procedure.

13. The apparatus of claim 7, wherein at least one processor of the one or more processors is configured to cause the network node to:

receive a triggering indication associated with the phase sweeping procedure.

14. The apparatus of claim 7, wherein the first network node is a first transmission reception point (TRP), and the one or more second network nodes are one or more second TRPs.

15. The apparatus of claim 7, wherein the first network node is a first wireless energy transmitter (WET), and the one or more second network nodes are one or more second WETs.

16. A method of wireless communication performed at an ambient internet of things (IoT) device, comprising:

receiving, in accordance with a phase sweeping procedure, a signal that is a combination of a first signal transmitted by a first network node at a first phase and one or more second signals transmitted by one or more second network nodes at one or more second phases;

transmitting an indication of the one or more second phases in accordance with a received signal power; and transmitting, responsive to the signal, a backscattered signal that contains an identification of the ambient IoT device.

17. The method of claim 16, wherein the phase sweeping procedure is a beam-phase sweeping procedure.

18. The method of claim 16, wherein transmitting the indication of the one or more second phases comprises transmitting, responsive to the signal, an indication of the combination of the first signal and the one or more second signals.

19. The method of claim 18, further comprising:

transmitting a triggering indication associated with the phase sweeping procedure.

20. The method of claim 16, wherein the first network node is a first transmission reception point (TRP), and the one or more second network nodes are one or more second TRPs.

* * * * *